(12) United States Patent
Di Cairano et al.

(10) Patent No.: US 12,472,981 B2
(45) Date of Patent: Nov. 18, 2025

(54) SYSTEMS AND METHODS FOR DECISION MAKING FOR AUTONOMOUS VEHICLES

(71) Applicant: Mitsubishi Electric Research Laboratories, Inc., Cambridge, MA (US)

(72) Inventors: Stefano Di Cairano, Newton, MA (US); Abraham Vinod, Cambridge, MA (US); Terrence Skibik, Boulder, CO (US); Avishai Weiss, Boston, MA (US); Karl Berntorp, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 189 days.

(21) Appl. No.: 18/234,408

(22) Filed: Aug. 16, 2023

(65) Prior Publication Data
US 2025/0002042 A1    Jan. 2, 2025

Related U.S. Application Data

(60) Provisional application No. 63/524,529, filed on Jun. 30, 2023.

(51) Int. Cl.
*B60W 60/00* (2020.01)
*B60W 30/095* (2012.01)
*B60W 30/18* (2012.01)

(52) U.S. Cl.
CPC .... *B60W 60/0011* (2020.02); *B60W 30/0956* (2013.01); *B60W 30/18163* (2013.01); *B60W 2554/4041* (2020.02)

(58) Field of Classification Search
CPC ......... B60W 60/0011; B60W 30/0956; B60W 30/18163; B60W 2554/4041; B60W 30/18109; B60W 2554/80; G05D 1/00; G08G 1/00; G01C 21/00
See application file for complete search history.

(56) References Cited

U.S. PATENT DOCUMENTS

| | | |
|---|---|---|
| 9,915,948 B2 | 3/2018 | Merl |
| 10,860,023 B2 | 12/2020 | Merl |
| 11,731,620 B2 * | 8/2023 | King ............... B60W 60/00272 701/301 |

(Continued)

*Primary Examiner* — Angelina M Shudy
(74) *Attorney, Agent, or Firm* — Gene Vinokur

(57) ABSTRACT

A control system for controlling a motion of an ego-vehicle traveling to a target destination is provided. The control system includes a memory and a processor to execute instruction stored by the memory. The memory stores multiple trajectory-generating functions corresponding to a maneuver defined by a parameter vector associated with a driving decision. The parameter vector is defined by one or multiple parameters. Each of the multiple trajectory-generating functions is configured to generate an achieving sequence of regions of states and values of the parameter vector reaching an input target region within a prediction horizon. The stored instructions cause the control system to test control admissibility of at least some of the driving decisions consistent with the target destination of the ego-vehicle at a current state. The stored instruction also caused the control system to control the ego-vehicle according to one of the admissible driving decisions.

20 Claims, 24 Drawing Sheets

(56) References Cited

U.S. PATENT DOCUMENTS

| | | | | |
|---|---|---|---|---|
| 12,026,442 | B2* | 7/2024 | Sun | G06F 30/27 |
| 12,060,060 | B1* | 8/2024 | Costantino | G06F 16/285 |
| 12,174,637 | B1* | 12/2024 | Okamoto | G05D 1/0214 |
| 12,246,749 | B2* | 3/2025 | Floor | B60W 30/0956 |
| 12,286,151 | B1* | 4/2025 | Greiff | B62D 13/06 |
| 2015/0344030 | A1* | 12/2015 | Damerow | G06V 20/588 |
| | | | | 701/1 |
| 2018/0074505 | A1* | 3/2018 | Lv | B60W 60/00272 |
| 2018/0281785 | A1* | 10/2018 | Berntorp | B60W 30/09 |
| 2019/0016338 | A1* | 1/2019 | Ishioka | B60W 30/18163 |
| 2019/0317511 | A1* | 10/2019 | Xu | G05D 1/0214 |
| 2019/0389459 | A1* | 12/2019 | Berntorp | B60W 30/09 |
| 2019/0391580 | A1* | 12/2019 | Di Cairano | G08G 1/165 |
| 2020/0089245 | A1* | 3/2020 | Yadmellat | B60W 30/18163 |
| 2020/0110416 | A1* | 4/2020 | Hong | G06N 20/00 |
| 2020/0249674 | A1* | 8/2020 | Dally | G05D 1/0221 |
| 2021/0004966 | A1* | 1/2021 | Behrendt | G08G 1/096716 |
| 2021/0101620 | A1* | 4/2021 | Buerkle | B60W 10/20 |
| 2021/0139022 | A1* | 5/2021 | Tao | G05D 1/81 |
| 2021/0139048 | A1* | 5/2021 | Russell | G08G 1/166 |
| 2021/0221402 | A1* | 7/2021 | Nakamura | B60W 50/0097 |
| 2021/0300415 | A1* | 9/2021 | Yasui | B60W 40/04 |
| 2022/0011776 | A1* | 1/2022 | Narang | G06F 18/217 |
| 2022/0048535 | A1* | 2/2022 | Niendorf | G01C 21/165 |
| 2022/0204030 | A1* | 6/2022 | Nishimura | B60W 30/0956 |
| 2022/0212693 | A1* | 7/2022 | Fang | B60W 60/0011 |
| 2022/0276655 | A1* | 9/2022 | Takahashi | G05D 1/0088 |
| 2022/0410938 | A1* | 12/2022 | Huang | G06N 3/0442 |
| 2022/0410939 | A1* | 12/2022 | Zhang | B60W 30/0953 |
| 2023/0037367 | A1* | 2/2023 | Qian | B60W 30/18163 |
| 2023/0053459 | A1* | 2/2023 | You | B60W 30/0956 |
| 2023/0099853 | A1* | 3/2023 | Mangas | B60W 60/00274 |
| 2023/0159027 | A1* | 5/2023 | Pronovost | B60W 60/0027 |
| | | | | 701/26 |
| 2023/0219585 | A1* | 7/2023 | Eiras | B60W 60/0013 |
| | | | | 701/25 |
| 2023/0347880 | A1* | 11/2023 | Clawson | G06V 20/58 |
| 2023/0415772 | A1* | 12/2023 | Wolff | B60W 60/0011 |
| 2023/0419080 | A1* | 12/2023 | Choi | G06N 3/0455 |
| 2024/0085914 | A1* | 3/2024 | Topan | G05D 1/0253 |
| 2024/0092398 | A1* | 3/2024 | Caldwell | B60W 30/18163 |
| 2024/0104335 | A1* | 3/2024 | Cui | G06N 3/006 |
| 2024/0149918 | A1* | 5/2024 | Li | G06N 20/00 |
| 2024/0149920 | A1* | 5/2024 | Zheng | B60W 40/04 |
| 2024/0217548 | A1* | 7/2024 | Pronovost | G06N 20/00 |
| 2025/0002049 | A1* | 1/2025 | Tam | B60W 60/001 |
| 2025/0053179 | A1* | 2/2025 | Higa | G05D 1/6987 |
| 2025/0058799 | A1* | 2/2025 | Inaba | G08G 1/16 |
| 2025/0206343 | A1* | 6/2025 | Schäfer | B60W 60/0011 |

\* cited by examiner

SYSTEMS AND METHODS FOR DECISION MAKING FOR AUTONOMOUS VEHICLES

FIELD OF THE DISCLOSURE

The present disclosure relates generally to autonomous driving and advanced driver-assistance systems, and, more particularly, to evaluating driving decisions of an ego-vehicle taking into account the current state of the vehicle and the behavior of nearby obstacles.

BACKGROUND

Conventional autonomously driving vehicles must be equipped with a control system that determines how the vehicle should move on the road, accounting for motor vehicle laws and traffic, to achieve its driving objectives. Conventional control systems determine vehicle motion by analyzing the environment based on data acquired by a plurality of sensors and processed by recognition and mapping algorithms, by computing a desired vehicle path and speed based on this environmental data, and by controlling the vehicle to follow that path using available vehicle actuators. Due to the complexity of such conventional operations, the conventional control systems include both path planning and vehicle control subsystems. For instance, U.S. Pat. No. 9,915,948 discusses how the vehicle control and the path planning subsystems can be integrated to guarantee that the vehicle achieves a desired driving objective.

Some methods have been proposed in the prior art for determining goals (or targets) of a path planning system of an autonomous vehicle that ensure that each intermediate goal can be achieved by a vehicle motion planned by a path planner in accordance with the traffic and driving rules, and that achieving a sequence of intermediate goals, leads to achieving the overall driving objectives. For instance, U.S. Pat. No. 10,860,023 proposes determining the intermediate goal that can be achieved by evaluating whether the state of the vehicle is contained in appropriate regions of space from which there exists trajectories that reach the goals, and then evaluate whether a candidate trajectory can be generated that does not collide with obstacles, including other vehicles, that are present in the road. Thus, while the method in U.S. Pat. No. 10,860,023 is appealing, it suffers from the limitation of requiring generating candidate trajectories online to check achievability of the goal while avoiding obstacles, and such check also requires collision-checking on a number of points along the trajectory. Both of these operations are computationally expensive as several trajectories need to be generated and multiple points of such trajectories need to be evaluated to determine if these points will collide with obstacles present on the road.

Thus, there is a need for systems and methods for determining goals for a path planning system of an autonomous vehicle that reduce the computations for ensuring that each intermediate target can be achieved by a vehicle motion planned by a path planner in accordance with the traffic and driving rules without colliding with obstacles.

SUMMARY

Some embodiments of the present disclosure are based on recognizing that there is a finite set of decisions an ego-vehicle can make while moving toward a final destination. For instance, in city driving, this set of decisions includes most driving tasks, such as whether to stay in a lane or change lanes, whether to maintain a speed or accelerate/decelerate, and/or whether to yield to other vehicles at intersections. Thus, at least one realization is that while there are a finite set of decisions a vehicle can make, there is also an infinite number of trajectories along which the vehicle may move and still satisfy the same decision. Determining all of the trajectories a vehicle can follow to result in a certain decision, such as a lane change, while also determining whether the trajectories may be followed without colliding with another vehicle, is a daunting task and computationally expensive.

The term "ego-vehicle" as used herein refers to a self-driving (i.e. autonomous) or semi-autonomous vehicle equipped with sensor systems, computing devices, and control mechanisms that enable it to perceive its environment, process data, and make decisions without direct human intervention. The ego-vehicle is capable of autonomously navigating through a road or traffic environment, detecting and avoiding obstacles, and following traffic regulations, thereby providing transportation services with limited or no human involvement.

Some embodiments of the present disclosure are based on the realization that determining whether a certain decision is to be made is dependent on whether that decision can be accomplished by a safe trajectory of the vehicle. However, determining such trajectories explicitly is difficult to implement in real time due to the computational limitations. Consequently, several embodiments of the present disclosure are based on the understanding that determining whether certain decisions lead to a safe trajectory of the vehicle that achieve such decision is consistent with determining what states the vehicle can be in to reach a desired target region of states. For instance, a decision to change lanes should result in the vehicle ending up in the desired lane, possibly in a desired longitudinal segment of the road. Several embodiments herein determine whether to change lane based on whether such a position in the other lane can be reached from the current position of the vehicle.

Furthermore, Applicant has realized and appreciated that it is not sufficient to determine whether a state of the vehicle consistent with the decision, such as lane change, is possible to be reached from the current position of the vehicle. In addition, it is also necessary to determine whether obstacles, such as other vehicles, pedestrians, and bicycles, pose a risk of intersecting with the set of possible trajectories of the vehicle.

In this disclosure, it is further realized that the limitation of the method proposed in U.S. Pat. No. 10,860,023 is due to separately addressing the two requirements of (1) achievability of the goal (also referred to as targets, target regions, or target region of states) and of (2) safety with respect to obstacles, including other vehicles. While each of the two requirements can be tested separately by verifying that the state of the vehicle belongs to a region from which there exists a trajectory that achieves the goal, and to a region from which there exists a trajectory that avoids the obstacles, separately evaluating the two requirements is not enough to guarantee satisfaction of the two requirements at the same time. In other words, it is possible to guarantee that a first trajectory exists that achieves the goal and a second trajectory that avoids the obstacle, but that is not enough to guarantee both at the same time, since the first and second trajectories are not usually equal. In this disclosure, it is realized that this issue stems from only computing regions of the states, from which the initial state of the trajectory is determined, while the entire trajectory is constructed also from inputs that are applied to the vehicle. U.S. Pat. No.

10,860,023 stayed away from expanding the region of state space into regions of state and inputs space, because the number of inputs defining the input space can be very large, since one input may be applied to the vehicle at any instant of time. A vehicle state space may be in 3-9 dimensions (e.g., some among positions, velocities, accelerations, in up to 2 dimensions, plus yaw, yaw rate, yaw acceleration for angular motion), while an input may be of 2 dimensions (e.g., steering and accelerator-brake). Since a different command is applied at every instant, with the changing of the command every 100 milliseconds, for 10 seconds of driving this results in 200 dimensions added by including the input space. The computations in such large dimensions become too time and resource consuming for applying the methods in U.S. Pat. No. 10,860,023, which is why such inputs are eliminated in U.S. Pat. No. 10,860,023 by projection. However, as projection removes information on the input, this results in the incompatibility of checking achievability of goals and avoidance of collisions separately, and hence U.S. Pat. No. 10,860,023 resorts to later using candidate trajectories to check collision avoidance and goal achievability, which also requires several calculations.

Additionally, Applicant has realized and appreciated that, rather than using motion models of the vehicles that are to be controlled, desirable trajectories of the vehicle under control can be parametrized and represented by a low dimensional (e.g., 1 or 2 dimension) parameter vector via trajectory-generating functions. Such parameters of the parameter vector may include a target velocity for executing the maneuver, a target constant deceleration to come to a stop, and/or a target lateral or longitudinal position to achieve with respect to the road. The parameter vector can be used in one or more trajectory-generating functions. The trajectory-generating functions generate trajectories entirely from the state of the vehicle at the beginning of the trajectory and the single value of the parameter vector. Then, one or more processing components can separately compute first regions of states and parameters from which the trajectory generated by the trajectory-generating function from the ego-vehicle state as initial state of the trajectory and the parameter as value of the parameter vectors achieves the goal in a given time interval, and second regions of states and parameters from which the trajectory generated by the trajectory-generating function from the state as initial state of the trajectory and the parameter as value of the parameter vectors collides with one of the obstacles in a given time interval.

In this disclosure, it is further realized that a driving decision for the vehicle is feasible, that is a state of the vehicle can achieve the goal in a given number of steps and avoid collisions in said number of steps, if there exists a value of the parameter vector, such that the state and parameter are inside the first regions of states, called achieving regions, computed for a given time interval less than or equal to a desired time interval of the maneuver, and are outside of all the second regions of states, called colliding regions, computed for the same given time interval less than or equal to a desired time interval of the maneuver. Thus, evaluation of only one condition is required, separately for each of the two requirements of achieving the goal and avoiding obstacles, and the separate evaluation ensures that the resulting trajectory from the trajectory-generating function achieves the goal and does not collide with obstacles. In different embodiments of the present disclosure, the colliding regions for the entire desired time interval of the maneuver (regardless of the given time interval) are used in evaluating the achieving sets.

In this disclosure, it is also realized that additional constraints imposed by traffic rules, such as speed limits, road boundaries, etc., can also be included in generating the achieving sets by properly trimming the states and parameters that violate said traffic rules from achieving sets. Hence, the satisfaction of the said membership conditions also ensures satisfaction of said traffic rules.

In this disclosure, it is also realized that an optimal value of the parameter vector with respect to a desired cost function may be generated by determining the value of the parameter vector that optimizes the cost function among those values for which the current state of the vehicle and the value of the parameter vector are inside the achieving sequence and outside the colliding sequence. The cost function may be constructed based on a variety of desired characteristics, such as, for instance, (1) the time to complete the maneuver, (2) the velocity at which the maneuver is accomplished, and/or (3) the acceleration experienced as a result of the maneuver. In this disclosure, it is further realized that a robustness metric can be included in the cost function to ensure that small prediction or modeling error do not cause failure of a supposedly admissible maneuver by computing, for each value of the parameter vector, the maximum perturbation on such value of the parameter vector for which the maneuver remains feasible, and including such value in the cost function.

In some embodiments of the present disclosure, a value of the parameter vector has been determined for which the current state of the vehicle and the value of the parameter vector are inside the achieving set and outside the colliding set, a set of waypoints can be provided to the motion planner to guide in achieving the goal and avoiding the obstacles by executing the trajectory-generating function from the current vehicle state with the determined value of the parameter vector, without needing to check the collision of such trajectory or that it actually achieves the goal.

Some embodiments of the present disclosure may rely on a motion model of the obstacles to include exogenous inputs that act as disturbances to account for an environment that is not entirely deterministic, hence generating multiple colliding sets for each obstacle, with the requirement that a single value of the parameter vector is found to stay out from them all.

Further, some embodiments contemplate obtaining information from turning lights of other vehicles, onboard sensors, vehicle to vehicle communication, and stop signal information that can be used to provide information to the decision-making process. This information can then be used to determine whether other objects on or close to the road pose any risk of entering the set of regions of states for the dynamics of the vehicle. Further, some embodiments may utilize the information about the set of waypoints and send the data to a motion planner, which based on the set of waypoints can determine a trajectory of the vehicle that achieves the goal and avoids the obstacles.

Generally, in one aspect, a control system configured for controlling a motion of an ego-vehicle traveling to a target destination is provided. The control system includes a memory. The memory is configured to store multiple trajectory-generating functions. Each of the multiple trajectory-generating functions corresponds to a maneuver. The maneuver is defined by a parameter vector. The parameter vector is associated with a driving decision of a plurality of driving decisions. The parameter vector is defined by one or multiple parameters. Each of the multiple trajectory-generating functions is configured to generate a sequence of states within a prediction horizon, from a given value of the parameter vector and an initial state of the vehicle. At least two of the multiple trajectory-generating functions are configured for different types of parameters of the parameter vector.

The control system further includes at least one processor coupled with stored instructions. When executed by the processor, the stored instructions cause the control system to test control admissibility of at least some of the driving decisions consistent with the target destination of the ego-vehicle at a current state. The stored instruction also caused the control system to control the ego-vehicle according to one of the admissible driving decisions.

To test the driving decision, the processor is configured to (1) map the tested driving decision to a target region of states of the ego-vehicle at an instance of time within the prediction horizon; (2) collect one or multiple obstacle states of one or multiple obstacles proximate to the ego-vehicle at one or multiple instances of time within the prediction horizon; (3) construct the sequence of achieving regions of states and values of the parameter vector reaching the target region of states of the ego-vehicle within the prediction horizon for the trajectory-generating function associated with the tested driving decision for the target region of states of the ego-vehicle; (4) construct one or multiple sequences of colliding regions of states and values of the parameter vector reaching each of the one or multiple obstacle states within the prediction horizon for the trajectory-generating function associated with the tested driving decision for each of the one or multiple obstacle states; (5) declare the driving decision as the admissible driving decision if there is at least one of the one or multiple values of the parameter vector for which the current state of the ego-vehicle is inside the achieving sequence of regions of states reaching the target region of states of the ego-vehicle and outside of all of the colliding sequences of regions of states reaching each one or multiple obstacle states; (6) and control the ego-vehicle according to a motion model corresponding to the admissible driving decision.

According to an example, at least one value of the one or multiple parameters of the parameter vector is a steady state target value for the motion generated by the trajectory-generating function. The one or multiple parameters of the parameter vector may include target lateral displacement, target longitudinal displacement, target velocity, and/or target heading.

According to an example, at least one of the trajectory-generating functions are generated by fitting motion data according to a parametric dynamical model.

According to an example, the driving decision may include changing lanes, following a lane, stopping, turning left, or turning right.

According to an example, the current state of the ego-vehicle may include a current location and least some of a current velocity, a current acceleration, and/or a current heading. The region of states may include a target range of positions and at least some of a target range of velocity, a target range of acceleration, and/or a target range of heading.

According to an example, the target region is represented as a target polyhedron about a target center location. The target center location moves according to a motion prediction model. The achieving sequence of achieving regions of states and values of the parameter vector is constructed such that if a parameter value of the achieving sequence is applied to a corresponding state value, the target region is entered within a fixed number of achieving steps. The fixed number of achieving steps is shorter than a length of the maneuver which is shorter or equal to the prediction horizon.

According to an example, at least one of the one or multiple obstacle states includes an obstacle region, and at least one of an obstacle velocity value, an obstacle acceleration value, and/or an obstacle yaw rate value.

According to an example, the obstacle region is represented as an obstacle polyhedron about an obstacle center location. The obstacle center location moves according to a motion prediction model. At least one of the sequences of colliding regions of states and values of the parameter vector is constructed such that if a parameter value of at least one of the colliding sequences is applied to a corresponding state value, the obstacle region is entered within a fixed number of colliding steps. The fixed number of colliding steps is shorter than a length of the maneuver.

According to an example, at least one of the sequence of achieving regions of states and/or the one or multiple sequences of colliding regions of states associated to at least one of the multiple trajectory-generating functions are computed prior to vehicle system operation and stored in the memory.

According to an example, at least one of the multiple trajectory-generating functions is obtained by combining a motion model with a vehicle controller model. A value of the parameter vector associated with the at least one of the multiple trajectory-generating functions is a setpoint of the control system.

According to an example, upon determining one value of the parameter vector for one driving decision determined to be an admissible driving decision, the control system immediately stops testing others of the at least some of the driving decisions.

According to an example, the processor is further configured to determine all values of the parameter vector with a given value range that corresponding to admissible driving decisions.

According to an example, the driving decision is declared as the admissible driving decision by evaluating upper bound inequalities determining one or more regions within the achieving regions and outside of the colliding regions. The upper bound inequalities are evaluated by: (1) inserting values corresponding to the current state of the ego-vehicle into the upper bound inequalities to obtain reduced order inequalities; (2) removing redundant inequalities; and (3) determining one or more values of the parameter vector that satisfy the reduced order inequalities.

According to an example, the reduced order inequalities include a first inequality and a second inequality. The first inequality is obtained by retaining one of the reduced order inequalities with the largest ratio of constant term and positive coefficient of the value of the current state. The second inequality is obtained by retaining one of the reduced order inequalities with the smallest ratio of constant term and positive coefficient of the value of the current state.

According to an example, the admissible driving decision is selected according to a maneuver priority level. The maneuver priority level corresponds to a desirability of the maneuver for driver comfort and driving performance.

According to an example, a value of the parameter vector is determined by optimizing a cost function subject to constraints of the value of the parameter vector that must result in an admissible driving decision. The cost function includes at least one of the following terms: maneuver velocity, maneuver completion time, driver comfort, maneuver aggressiveness, parameter value amplitude, and maneuver robustness, and wherein the maneuver robustness is defined as the maximum value that any perturbation of amplitude equal or smaller than such maximum value still results in an admissible maneuver.

According to an example, the processor controls ego-vehicle by providing a motion planner of the ego-vehicle the maneuver and the target region of states corresponding to the admissible driving decision. The processor further provides the motion planner with a set of achieving regions providing a suggested trajectory to achieve the target region of states. The suggested trajectory is computed by the trajectory-generating function of the maneuver corresponding to the admissible driving decision for the value of the parameter vector achieving the target region of states from the current state of the vehicle.

Generally, in another example, a method for controlling a motion of an ego-vehicle traveling to a target destination is provided. The method includes: (1) mapping, via at least one processor, a driving decision to a target region of states of the ego-vehicle at an instance of time within a prediction horizon; (2) collecting, via the at least one processor, one or multiple obstacle states of one or multiple obstacles proximate to the ego-vehicle at one or multiple instances of time within the prediction horizon; (3) constructing, via the at least one processor, sequence of achieving regions of states and values of a parameter vector reaching the target region of states of the ego-vehicle within the prediction horizon for one of multiple trajectory-generating functions associated with the driving decision for the target region of states of the ego-vehicle, wherein each of the multiple trajectory-generating functions corresponds to a maneuver defined by the parameter vector associated with the driving decision; (4) constructing, via the at least one processor, one or multiple sequences of colliding regions of states and values of the parameter vector reaching each of the one or multiple obstacle states within the prediction horizon for the trajectory-generating function associated within the driving decision for each of the one or multiple obstacle states; (5) declaring, via the at least one processor, the driving decision as an admissible driving decision if there is at least one of the one or multiple values of the parameter vector for which a current state of the ego-vehicle is inside the achieving sequence of regions of states reaching the target region of states of the ego-vehicle and outside of all of the colliding sequences of regions of states reaching each one or multiple obstacle states; and (6) controlling, via the at least one processor, the ego-vehicle according to the admissible driving decisions to reach the target region of states of at least one of the admissible driving decisions.

Generally, in another example, a non-transitory computer readable memory embodied thereon a program executable by at least one processor for performing a method for controlling a motion of an ego-vehicle traveling to a target destination is provided. The method includes: (1) mapping, via at least one processor, a driving decision to a target region of states of the ego-vehicle at an instance of time within a prediction horizon; (2) collecting, via the at least one processor, one or multiple obstacle states of one or multiple obstacles proximate to the ego-vehicle at one or multiple instances of time within the prediction horizon; (3) constructing, via the at least one processor, sequence of achieving regions of states and values of a parameter vector reaching the target region of states of the ego-vehicle within the prediction horizon for one of multiple trajectory-generating functions associated with the driving decision for the target region of states of the ego-vehicle, wherein each of the multiple trajectory-generating functions corresponds to a maneuver defined by the parameter vector associated with the driving decision; (4) constructing, via the at least one processor, one or multiple sequences of colliding regions of states and values of the parameter vector reaching each of the one or multiple obstacle states within the prediction horizon for the trajectory-generating function associated within the driving decision for each of the one or multiple obstacle states; (5) declaring, via the at least one processor, the driving decision as an admissible driving decision if there is at least one of the one or multiple values of the parameter vector for which a current state of the ego-vehicle is inside the achieving sequence of regions of states reaching the target region of states of the ego-vehicle and outside of all of the colliding sequences of regions of states reaching each one or multiple obstacle states; and (6) controlling, via the at least one processor, the ego-vehicle according to the admissible driving decisions to reach the target region of states of at least one of the admissible driving decisions.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION

Figure 1:
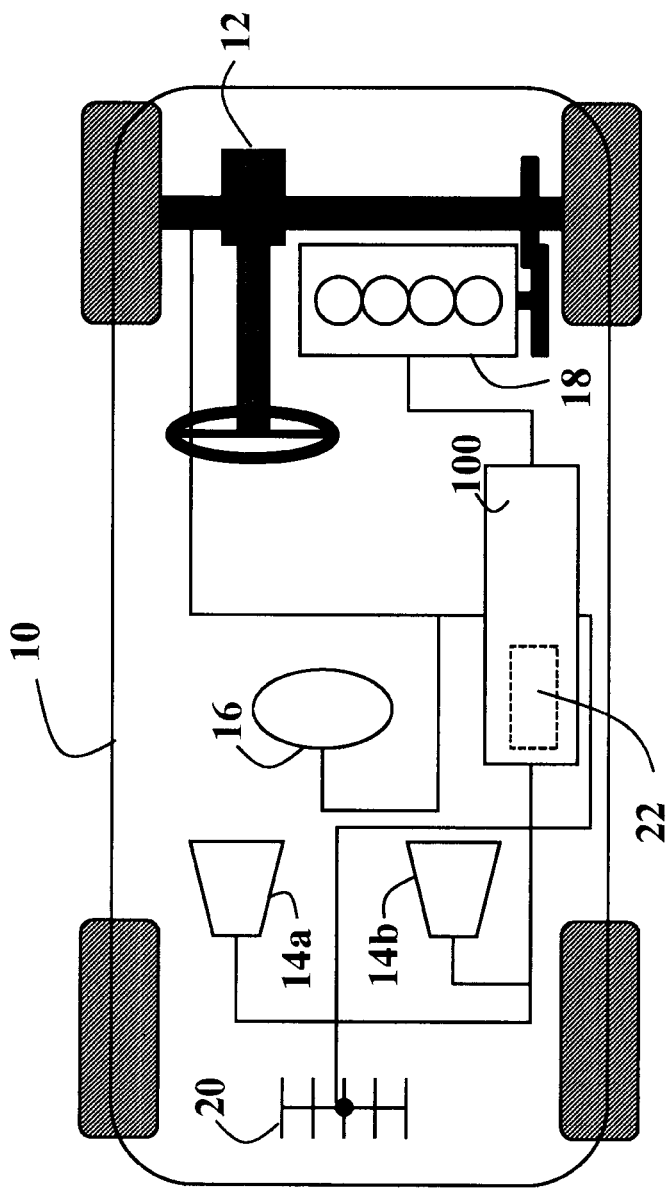
FIG. 1 is a schematic view of a vehicle including a control unit employing principles of some embodiments of the present disclosure.

As discussed in more detail with reference to FIGS. 1-22, the disclosure relates to a control system that evaluates driving decisions for an ego-vehicle based on predicted trajectories and obstacle states. It ensures that the chosen driving decision is admissible, taking into account the ego-vehicle's target destination and nearby obstacles. This system enables safer and more efficient autonomous or semi-autonomous driving for the ego-vehicle.

Accordingly, in its various embodiments and implementation, the disclosure focuses on a control system designed to manage the motion of an ego-vehicle as it travels towards a target destination and the ego-vehicle employing such system. The system utilizes a memory to store multiple trajectory-generating functions, each corresponding to a specific driving decision defined by a parameter vector. The parameter vector consists of one or more parameters that characterize the driving decision. These trajectory-generating functions generate sequences of states and parameter values within a prediction horizon to achieve a target region.

In various embodiments, the control system includes a processor that tests the control admissibility of various driving decisions based on the ego-vehicle's current state and target destination. To perform the testing, the processor maps the driving decision to a target region of states within the prediction horizon. It collects information about obstacle states near the ego-vehicle at different instances within the prediction horizon. The processor then generates achieving sequences of states and parameter values for reaching the target region of states and colliding sequences of states and parameter values for reaching the obstacle states within the prediction horizon for the trajectory-generating function associated with the tested driving decision. The control system is configured to declare a driving decision as admissible if, for at least one parameter value, the ego-vehicle's current state is within the achieving sequence of states reaching the target region of states and outside of all the colliding sequences of states reaching the obstacle states.

The term "driving decision" as used herein refers to a desired driving task for the ego-vehicle to accomplish. For example, the driving decision may be changing lanes from a first lane to a second lane of a two-lane road, following a lane for a specified distance from a current location, stopping a specified distance from a current location, turning left, turning right, slowing down to a desired velocity, speeding up to a desired velocity, etc. A route an autonomous or semi-autonomous vehicle may travel from a starting location (such as "home") to a final destination location (such as "work") may be defined by a sequence of driving decisions. Executing a driving decision results in transitioning the ego-vehicle from a "current state" to a state in the "target region of states." Thus, mapping driving decision onto a starting "current state" may be used to determine the resulting "target region of states" of the ego-vehicle. This is because the precise state is not always important for achieving the driving decision, and variations of the target states are allowed. This variation is referred to herein as a region of states. Similarly, mapping the driving decision onto a resulting "target region of states" may be used to determine the starting "current state" of the ego-vehicle.

The term "maneuver" as used herein relates to one or more actions taken by the ego-vehicle to accomplish the driving decision. For example, for a lane change from the first lane to the second lane, the maneuver may relate to laterally shifting from the first lane to the second lane while also moving longitudinally along the road. In another example, for a turn right, the maneuver may relate to the orientation of the vehicle rotating clockwise.

The term "trajectory" as used herein refers to a series of positions and orientations of the ego-vehicle at instances of time to accomplish a maneuver. For example, for the lane changing maneuver described in the previous paragraph, a trajectory would define a sequence of positions and orientations at instances of time the ego-vehicle could travel to the second lane from the first lane. In this example, the position and the velocity of the ego-vehicle travelling the in the first lane prior to following the trajectory could be considered components of a "current state" of the ego-vehicle. Similarly, the position and the velocity of the ego-vehicle travelling the in the second lane after following the trajectory could be considered components of a "the target region of states" of the ego-vehicle.

The term "trajectory-generating function" as used herein refers to an equation to generate a trajectory as defined in the previous paragraph. The trajectory-generating function may be defined in terms of a series of parameters, referred to as a "parameter vector." The parameters may include a variety of properties or characteristics of the ego-vehicle after following a trajectory, such as lateral displacement, longitudinal displacement, velocity, heading, etc. Thus, by providing the trajectory-generating function with values for certain parameters and the current state of the ego-vehicle, the trajectory-generating function can define a sequence of positions at instances of time to reach the target region of states.

FIG. 1 is a schematic of a vehicle 10 including a control unit 100 (also referred to herein as a "controller" and/or a "control system") employing principles of some embodiments of the present disclosure. For example, FIG. 1 shows a schematic of a vehicle 10 including a control unit 100 employing principles of some embodiments of the present disclosure. As used herein, the vehicle 10 can be any type of wheeled vehicle, such as a passenger car, bus, motorcycle, rover, etc. Also, the vehicle 10 can be an autonomous or semi-autonomous vehicle. For example, some embodiments of the control unit 100 control the motion of the vehicle 10. Examples of the motion include lateral motion of the vehicle controlled by a steering system 12 of the vehicle 10. The steering system 12 is controlled by the controller 100.

The vehicle 10 can also include an engine 18. The engine 18 can be controlled by the controller 100 or by other components of the vehicle 10. The vehicle 10 can also include one or more sensors 16 to sense, by non-limiting example, its current motion quantities and internal status. Examples of the sensors 16 can include global positioning systems (GPS), accelerometers, inertial measurement units, gyroscopes, shaft rotational sensors, torque sensors, deflection sensors, pressure sensors, and flow sensors. The vehicle 10 can be equipped with a transceiver 20 enabling communication capabilities of the controller 100 through wireless communication channels via an input interface 22. The vehicle 10 can also include one or more other, environmental sensors 14a, 14b to sense the surrounding environment. Examples of the environmental sensors 14a, 14b can include distance range finders, radars, lidars, and cameras. Alternatively or concurrently, information about the surrounding environment can be received through the transceiver 20. The vehicle 10 is equipped with a map database system that stores information about the road in the area where the vehicle 10 operates, or it can access map information stored remotely through the transceiver 20.

Figure 2:
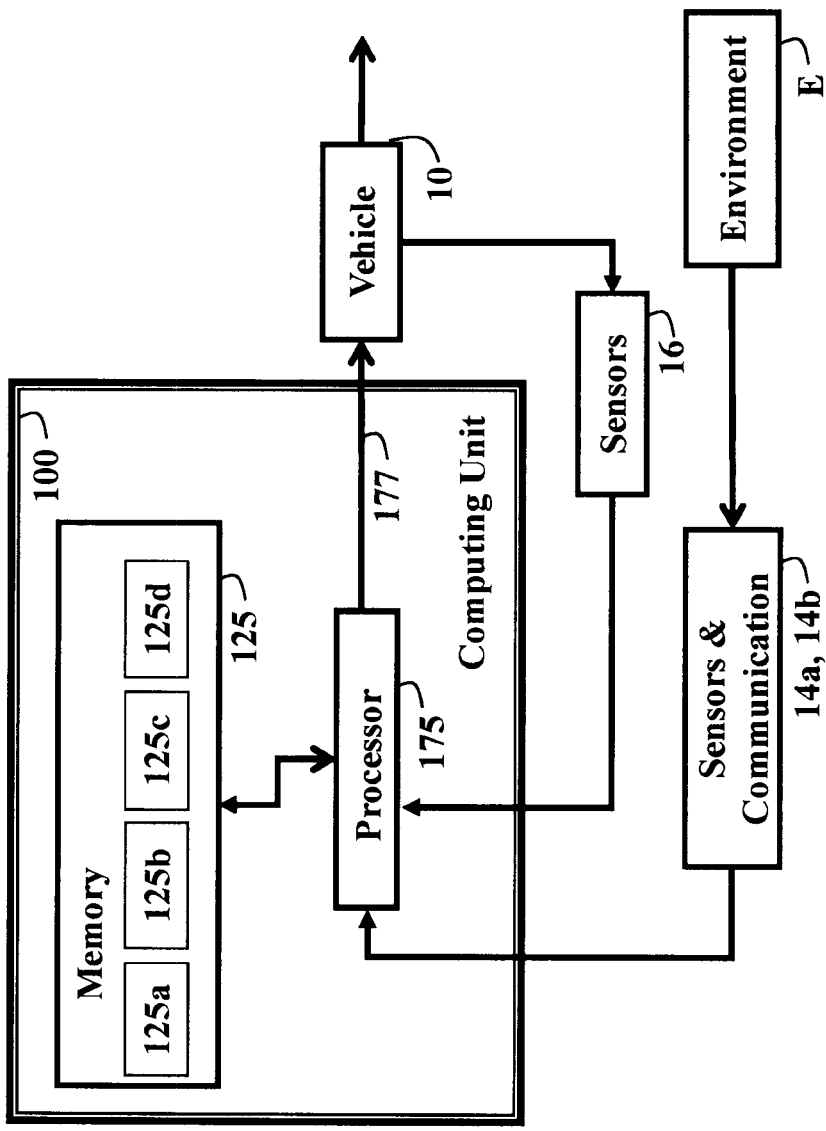
FIG. 2 is a block diagram of the control unit of FIG. 1 according to some embodiments of the present disclosure.

FIG. 2 is a block diagram of the control unit 100 of FIG. 1 according to some embodiments of the present disclosure.

The controller 100 includes a hardware processor 175 electrically coupled to a memory 125, e.g., a non-transitory computer readable medium. Aspects of the memory 125 and the processor 175 are shown in further detail in FIGS. 19-21. In some examples, the processor 175 may include a plurality of processing components. In some implementations, the memory 125 includes a first section 125a for storing information about the vehicle motion and at least one trajectory-generating function 102, a second section 125b for storing a program for controlling the vehicle, a third section 125c for storing driving map data, and a fourth section 125d of the memory 125 for storing one or more motion models 162, 178 for different types of obstacles O and target regions 150 where the vehicle 10 is requested to drive.

For example, the first section 125a of the memory 125 can store functions that generate the motion of the vehicle 10 for common operations such as lane keeping, lane changing, stopping at a point, and/or following a leading vehicle. Furthermore, the first section 125a of memory 125 may store parameters for the behavior of the vehicle 10, such as maximum acceleration, steering, and steering rate. Also, for example, the fourth section 125d of the memory 125 can store a model of motion 178 of other vehicles, and a model of the motion 162 of the target range of positions 150 for a lane change.

The second section 125b of the memory 125 can have embodied thereon a program executable by the processor 175 for performing a method for controlling the vehicle 101.

Still referring to FIG. 2, the third section 125c of the memory 125 may include map information, such as addresses and road networks. The third section 125c may also include additional map information such as intersections, stop light locations and traffic light locations, number and position of lanes, speed limit, etc. The map information may be stored already in the third section of the memory 125c when the vehicle starts driving. Alternatively, this information may be made available to the control unit 100 by the communication transceiver 20 and the environment sensors 14a, 14b.

The processor 175 can be any computational device capable of performing computations, and can include one or many physical devices of the same or of different types. It is possible that the processor 175 can include multiple computational devices, e.g., multiple microprocessors. Similarly, the memory 125 can be any logical memory and/or non-transitory computer readable storage medium capable of storing information, and can include one or more physical information storage means, of the same or of different types. In some examples, the computations performed by the processor 125 are commanded by the program stored in the second section of the memory 125b. These computations use the vehicle information stored in the first section of the memory 125a, the information about the map stored in the second section of the memory 125b, the information about the obstacles O and target regions 150 stored in the fourth section 125d of the memory 125, the information about the vehicle 10 obtained from the sensors 16, and/or the information of the environment E obtained from the sensors 14a, 14b. The computation of the processor 175 results in commands 177 that may alter the motion of the vehicle 10.

Still referring to FIG. 2, the program executed by the processor 175 may enable autonomous driving (AD) of the vehicle 10. During this operation, the program executed by the processor 175 aims at achieving a specific final objective of driving, such as reaching a specific location. The final objective is achieved by appropriately influencing the motion of the vehicle 10. The software program executed by the processor 175 can logically be separated into multiple modules. For example, in one embodiment, the program executed by the processor 175 includes at least two modules arranged in a sequence such that output of one module is an input to a next module. As used herein, such layering specifies layers or logical modules of the control unit 100, and allows separating the control into different stages requiring different information.

Figure 3:
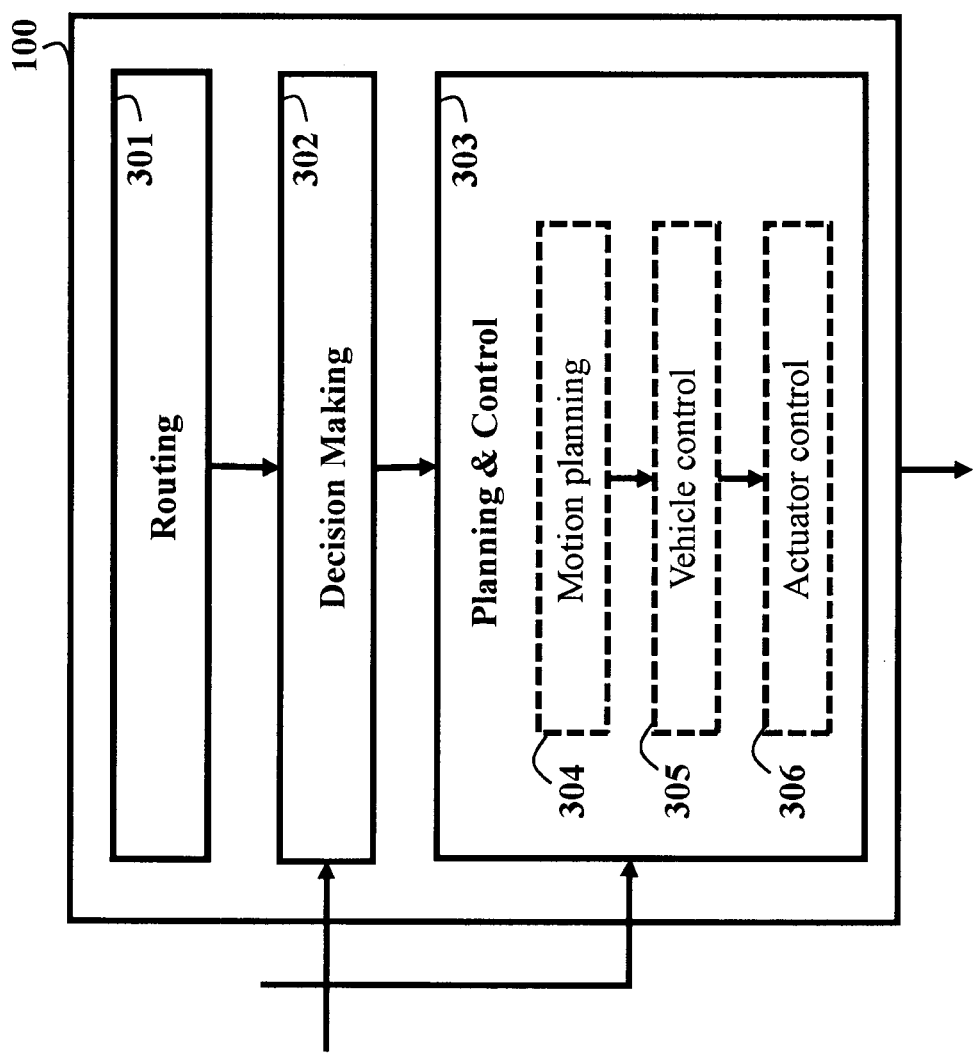
FIG. 3 is a schematic of modules and submodules of the control unit according to some embodiments of the present disclosure.

FIG. 3 shows a schematic of the modules of the control unit 100 according to one embodiment of the present disclosure. In this embodiment, the control unit 10 includes three layers of control, a routing module 301, a decision-making module 302, and a planning and control module 303. The planning and control module 303 further includes three submodules, namely, a motion planning submodule 304, a vehicle control submodule 305, and an actuator control submodule 306. The routing module 301 uses the static map information stored in the third section of the memory 125c of FIG. 2 and the current location 142 of the vehicle obtained from sensors 14a, 14b to determine a sequence of roads in the road network that the vehicle 10 must traverse from its current location 142 to reach its final destination (target range of positions 150) as provided, for instance, by the user. The routing module 301 can be implemented by a known car navigation system. The decision-making module 302 determines maneuvers to execute the route generated by the routing module 301 based on a variety of factors, such as achievability (whether the vehicle 10 can reach the target range of positions 150 of the maneuver) and safety (whether the vehicle 10 will collide with an obstacle O while executing the maneuver).

The planning and control module 303 implements the maneuvers chosen by the decision-making module 302 via the motion planning submodule 304, the vehicle control submodule 305, and the actuator control submodule 306. The motion planning submodule 304 determines the overall trajectory of the vehicle 10 required by the maneuver. The vehicle control submodule 305 determines commands of the vehicle actuators, such as steering, acceleration, and deceleration that modify the behavior of the vehicle 10 so that the vehicle 10 achieves an actual trajectory as close as possible to the trajectory provided by the motion planning module 304. The commands to the vehicle actuators are then received by the actuator control submodule 306 that generates and/or modifies control signals provided to the actuators, such as electric motor voltage, throttle opening, brake pads pressure, to achieve the desired vehicle commands.

Figure 4A:
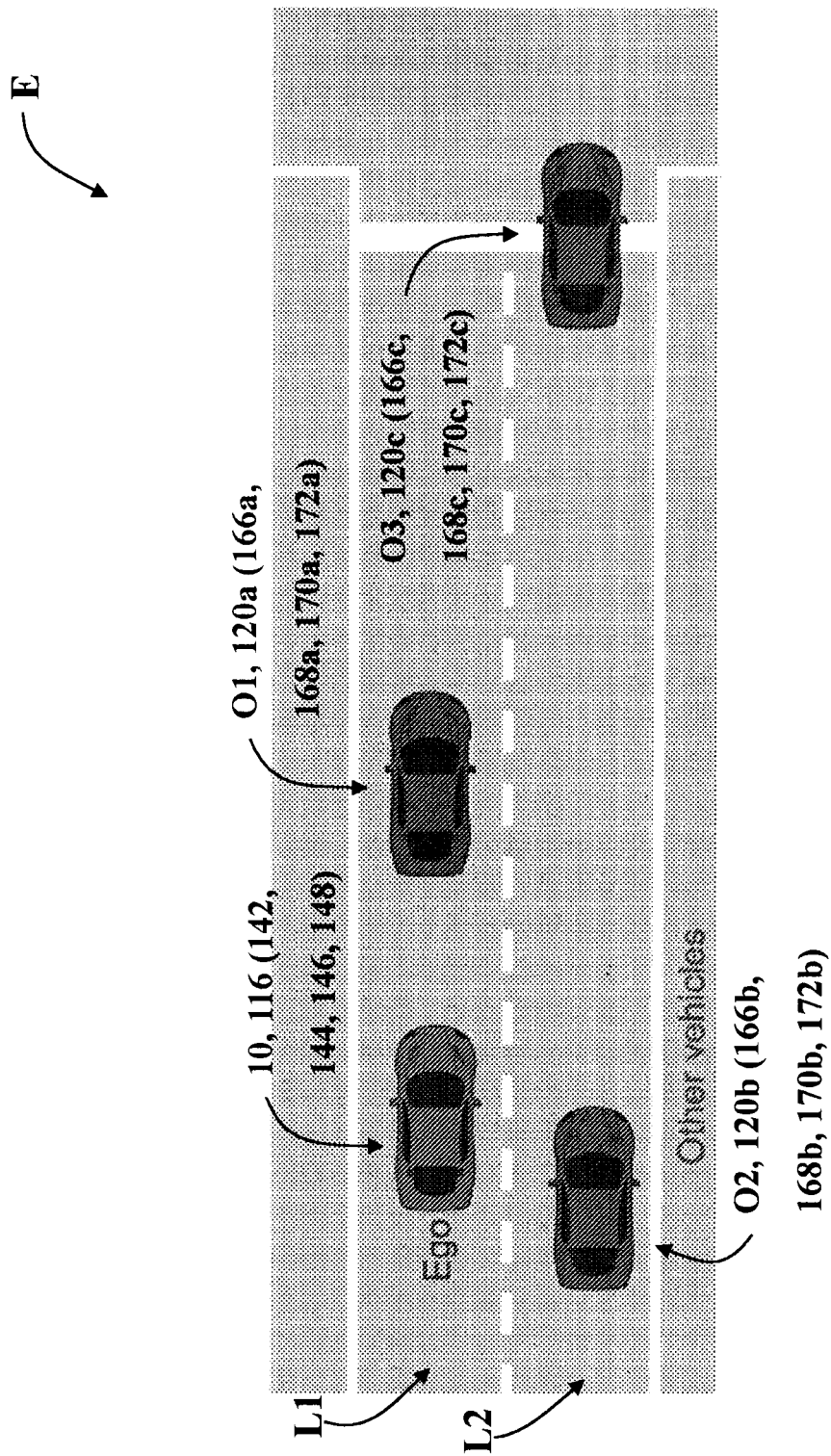
FIG. 4A illustrates an ego-vehicle and three obstacle vehicles on a two-lane road, in accordance with an example.

FIG. 4A illustrates an example traffic scenario involving an ego-vehicle 10 and three obstacles O1, O2, O3 in an example environment E comprised of a pair of lanes L1, L2. In this example, the ego-vehicle 10 may be a vehicle 10 controlled by the various aspects of the control unit 100 as shown with respect to FIGS. 1-3. The control of the vehicle 10 is dictated based on data corresponding to the environment E around the vehicle 10 as well as the various properties and characteristics of the vehicle 10 itself. While the ego-vehicle 10 is depicted as an automobile, though, in other examples, the ego-vehicle 10 may be any other type of motorized vehicle, such as a truck, motorcycle, bus, etc. Similarly, while the obstacles O1, O2, O3 are depicted as automobiles, in other examples, the obstacles O1, O2, O3 may be any other type of motorized vehicle. In even further examples, some of the obstacles O1, O2, O3 may be bicyclists and/or pedestrians.

As shown in the non-limiting example of FIG. 4A, the ego-vehicle 10 is positioned in a first lane L1. The ego-vehicle 10 may be defined as having a current state 116 describing the various properties and characteristics of the vehicle 10 at the present moment in time. For example, the current state 116 of the vehicle 10 may be defined in terms of a current location 142, a current velocity 144, a current acceleration (or deceleration) 146, and/or a current heading 148 (which may also be referred to as an orientation). In further examples, the current state 116 may also incorporate a heading rate and/or direction indicating a rate and direction of turning. In some examples, the various aspects of the current state 116 of the ego-vehicle 10 are determined by the internal sensors 16 of the vehicle 10 (such as GPS, accelerometers, gyroscopes, etc.), though, in some examples, data provided from additional sensors and/or sources may also be considered.

Similarly, the various properties and characteristics of the obstacles O1, O2, O3 may be defined in a similar manner as the ego-vehicle 10. For example, the obstacle state 120 of the vehicle 10 may be defined in terms of an obstacle region 166 (defining a two- or three-dimensional location space for the obstacle O), an obstacle velocity 168, an obstacle acceleration (or deceleration) 170, and/or an obstacle heading 172 (which may also be referred to as an orientation) at specific instances in time. More specifically, the first obstacle O1 has an obstacle state 120a defined by obstacle region 166a, obstacle velocity 168a, obstacle acceleration 170a, and/or obstacle heading 172a. The second obstacle O2 has an obstacle state 120b defined by obstacle region 166b, obstacle velocity 168b, an obstacle acceleration 170b, and/or an obstacle heading 172b. The third obstacle O3 has an obstacle state 120c defined by obstacle region 166c, obstacle velocity 168c, obstacle acceleration 170c, and/or obstacle heading 172c.

In further examples, the obstacle state 120 may also incorporate a heading rate and/or direction indicating a rate and direction of turning. In some examples, the various aspects of the obstacle states 120 of the obstacles O1, O2, O3) are collected and determined by the environmental sensors 14a, 14b of the vehicle 10 (such as distance range finders, radars, lidars, and cameras), though, in some examples, data provided from additional sensors and/or sources may also be considered. For example, some of the obstacles O1, O2, O3 may wirelessly transmit data related to aspects of their obstacle state 120 to be received by the transceiver 20 of the vehicle 10.

As shown in FIG. 4A, the ego-vehicle 10 is currently positioned in a first lane L1 behind a first obstacle O1. A second obstacle O2 is positioned next to the ego-vehicle in a second lane L2. A third obstacle O3 is positioned in the second lane L2 significantly ahead of the second obstacle O2. The ego-vehicle 10 and the three obstacles O1, O2, O3 are all oriented to be travelling from left-to-right of FIG. 4A.

Figure 4B:
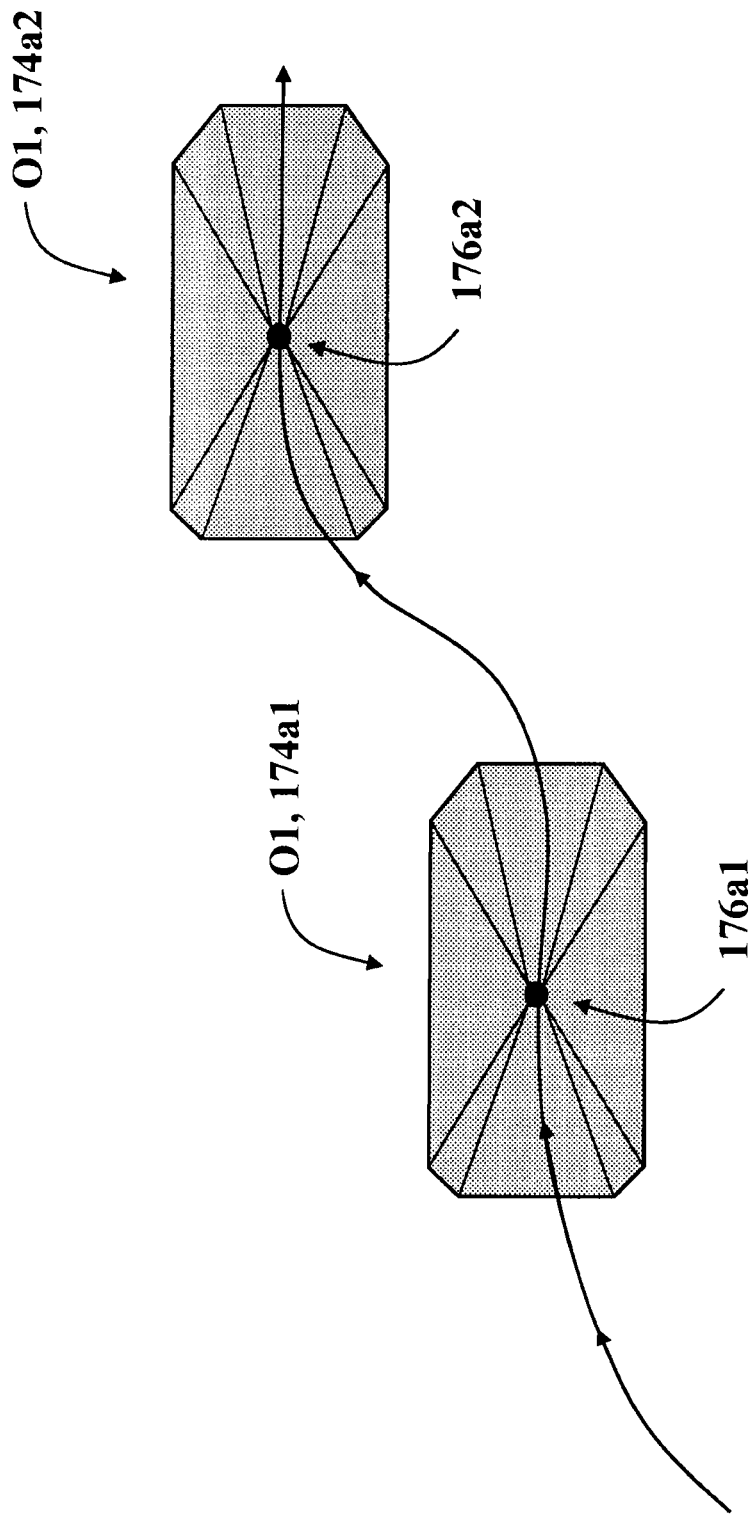
FIG. 4B illustrates motion of an obstacle vehicle represented as an obstacle polyhedron, in accordance with an example.

In some examples, an obstacle region 166 may be represented as an obstacle polyhedron 174. The obstacle polyhedron 174 may be defined about an obstacle center location 176. The obstacle center location 176 may move according to an obstacle motion prediction model 178 executed by the motion planning module 304. FIG. 4B illustrates motion of the first obstacle O1 from a first obstacle polyhedron 174a1 with a first center location 176a1 to a second obstacle polyhedron 174a2 with a second center location 176a2. The illustrated polyhedrons 174a1, 174a2 represent the extent and/or shape of the first obstacle O1. The motion of the first obstacle O1 may be determined according to an obstacle motion prediction model 178. Further, it should be understood that the center locations 176a1, 176a2, need not necessarily be the geometric center of the corresponding polyhedron 174a1, 174a2.

Figure 5:
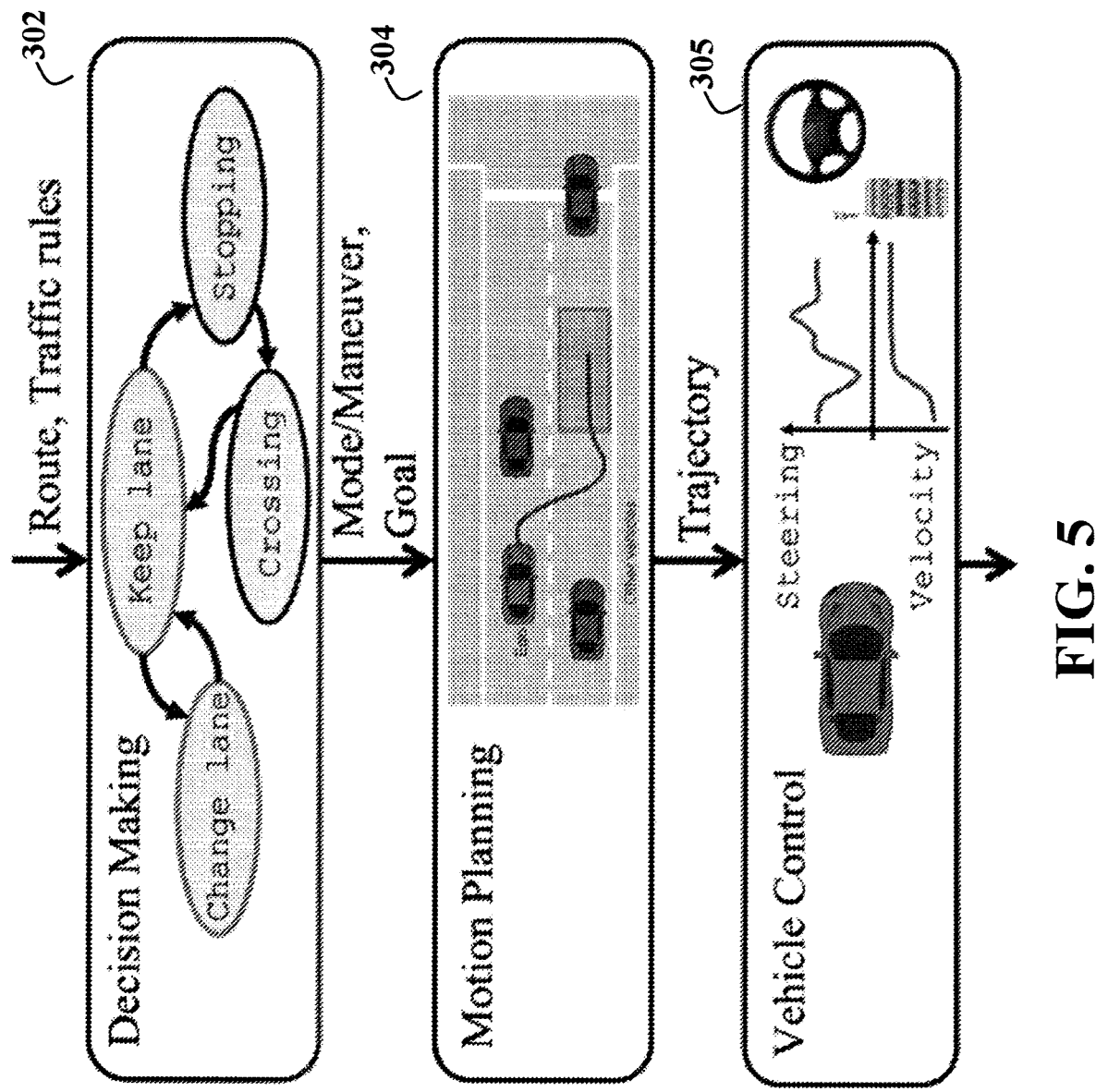
FIG. 5 illustrates an application of the modules of the control unit of FIG. 3 on the two-lane road example of FIG. 4A, in accordance with an example.

FIG. 5 illustrates an application of some of the modules 301, 302, 303 and the submodules 304, 305, 306 of the control unit 100 shown in FIG. 3 to the example traffic scenario of FIG. 4A. As shown in FIG. 5, the decision-making module 302 decides to execute a maneuver based on routing and traffic rule information provided by the routing module 301. In the example of FIG. 5, the decision-making module 302 evaluates several potential maneuvers (keep lane, change lane, stopping, crossing, etc.) to reach the routing goals or targets. Based on the evaluation, the decision-making module 302 decides to implement the change lane maneuver. The motion planning submodule 304 then determines a trajectory to achieve the maneuver. The vehicle control submodule 305 then determines how to implement the trajectory by adjusting the steering and velocity controls of the vehicle 10. However, before approving a maneuver to be implemented by the motion planning and vehicle control submodules 304, 305, the decision-making module 302 should also determine whether the maneuver is achievable based on the current state 116 of the vehicle 10, and if the vehicle 10 will collide with one or more obstacles O while attempting the maneuver.

Figure 6:
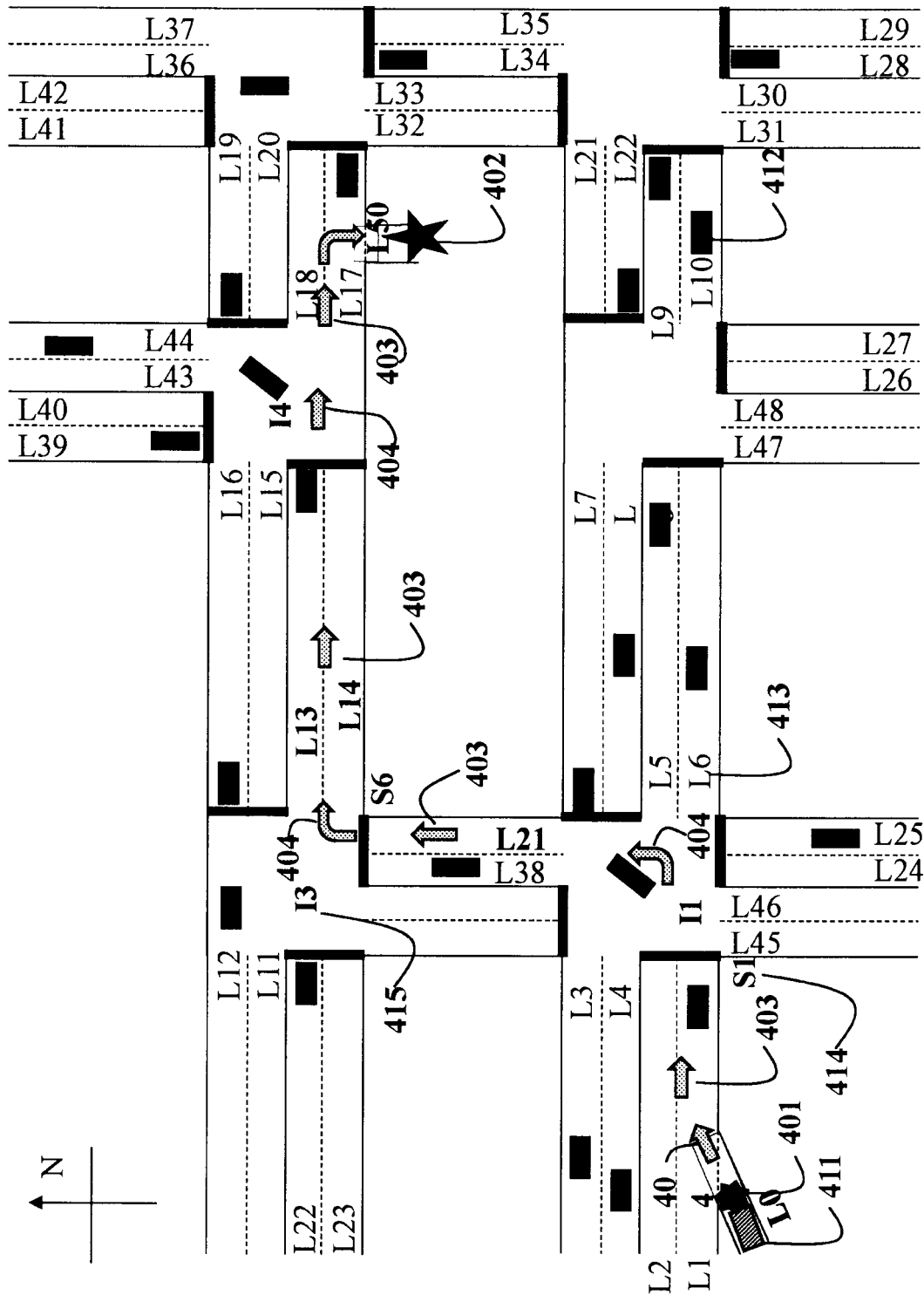
FIG. 6 illustrates a description of the routing information as used in some embodiments of the present disclosure in an exemplary traffic scene.

FIG. 6 illustrates a description of routing information as used in some embodiments of the present disclosure in a further exemplary traffic scene. For example, FIG. 6 depicts a scenario with the vehicle under autonomous or semi-autonomous control, referred to as ego-vehicle 411. FIG. 6 further depicts traffic, including other vehicles 412 shown similar to the ego-vehicle 411, a plurality of lanes 413 (such as lane six 413 marked as L6), a plurality of stop lines 414 (such as a first stop line 414 marked S1), and a plurality of intersections 415 (such as a third intersection 415 marked as I3). With reference to FIG. 6, for the ego-vehicle 411 at starting position 401, with final destination 402, the routing module 301 provides a (1) sequence of roads indicated by arrows 403 and (2) a sequence of turns indicated by arrows 404. It should be noted, however, that the sequence of roads 403 and the sequence of turns 404 is not by itself sufficient to specify a trajectory or a path for the ego-vehicle 411. On the contrary, there are a number of discrete decisions to consider, such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to consider, such as decisions to meet the timed sequence of positions and orientations that the vehicle should achieve on the travel from its initial point to its destination. These decisions cannot be considered by the routing module 301 because they depend on current traffic at the moment when the vehicle reaches a certain location. In general, the state of the current traffic is unknown to the routing module 301 due to the lack of information on or the uncertainty in prediction of the traffic motion and uncertainty of the moment at which the vehicle will reach the location.

The actual trajectory, in terms of sequence of positions and orientations and corresponding time instances, that the vehicle should execute to get to the final destination is usually determined by the planning and control module 303. However, the planning and control module 303 of FIG. 3 may not be able to operate based directly on the information provided by the routing module 301. In particular, operating discrete and continuous decision-making modules in a single step (such as, a single step from initial location to final destination) leads to a so-called hybrid decision problem, which, based on experimentation requires a very large number of computations. This very large number of computations may be unsuitable for some vehicles. In particular, the computing unit 100 often has limited memory 125 and processing speed, especially when manufacturing cost has to be reduced and/or robustness to environmental factors (temperature, humidity, electromagnetic disturbances) has to be increased. Hence, it is beneficial to decompose the single step from initial location to destination in a way that makes decision-making computationally tractable, yet it ensures that no inconsistencies are caused by the decomposition. That is, decomposing the overall problem into many simpler subproblems, solving each single subproblem in sequence, and operating according to the sequential solution of the subproblems, results in a solution to the overall problem.

Still referring to FIG. 6, another realization of the present disclosure is that one can decompose the problem in terms of discrete decisions and continuous decisions where a decision-making module 302 of FIG. 3 evaluates discrete decisions. These discrete decisions may include whether to change lanes or stay in the current lane, whether to start decelerating to stop at the stop line or not, whether to cross the intersection or not. The decision-making module converts these into intermediate targets for the planning and control module 303 of FIG. 3. The planning and control module 303 receives the current intermediate target and possibly additional parameters for adjusting its computation to the current intermediate target from the decision-making module 302, and performs its computation. The planning and control module 303 may inform the decision-making module 302 of the achievement of the current intermediate target, or the impossibility of achieving the current intermediate target. The targets provided by the decision-making module 302 should be achievable by the planning and control module 303 according to the current traffic conditions and vehicle conditions. The targets should also ensure that each of the sequence of intermediate targets are interconnected, i.e., the planner can switch to achieving a second target after achieving a first target, such that achieving all intermediate targets results in the ego-vehicle 411 achieving the overall goal, i.e., reaching the final destination position.

Thus, the decision-making module 302 of FIG. 3 processes the information from the routing module 301 using the map stored in the third section of the memory 213 of FIG. 2 to produce a sequence of targets. Additionally, using information from sensors 14a, 14b, the decision-making module 302 selects one or more alternative current targets to provide to the planning and control module 303 of FIG. 3. The planning and control module 303 uses the current targets and the alternative current targets to determine and execute a current trajectory.

Still referring to FIG. 6, it is a further realization of this present disclosure that some intermediate targets are specific and some other targets are optional. The road segments indicated by routing layer 301 of FIG. 3 determines specific targets, such as specific turns at intersections. However, there are additional specific targets due to the proper operation of the ego-vehicle 411 according to driving rules. For instance, staying stopped at a stop line, and also decelerating to stop at a stop line, is specific according to driving rules. Similarly, to stay on a specific lane at a specific intersection based on the turn to be taken at such intersection may be mandatory. The same can be said as regards being on a specific lane before exiting the general road.

Figure 7:
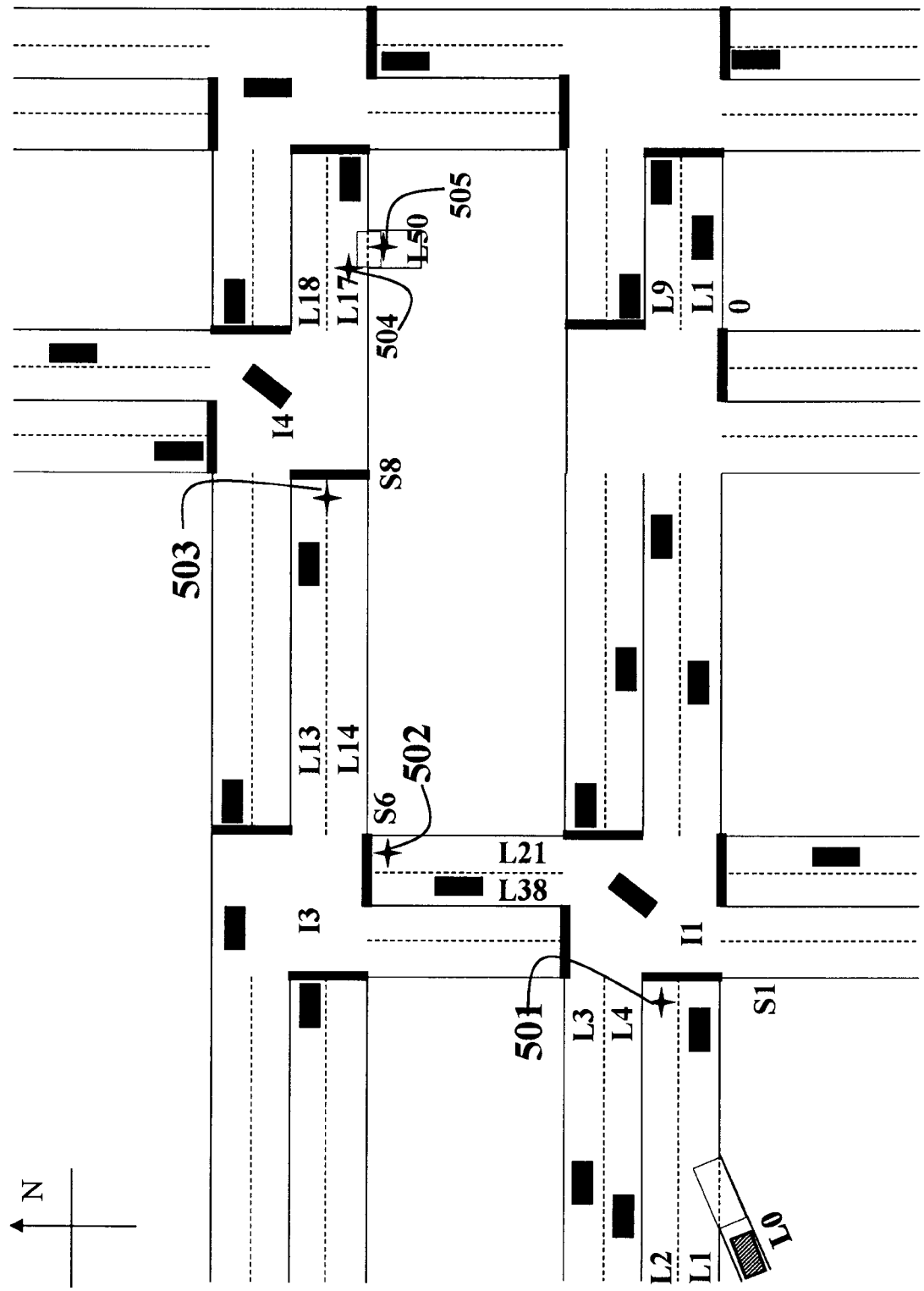
FIG. 7 illustrates a description of the specific intermediate targets as used in some embodiments of the present disclosure in the exemplary traffic scene.

FIG. 7 illustrates a variation of the traffic scenario of FIG. 6. In FIG. 7, the routing of the ego-vehicle 411 of FIG. 6 is show as a sequence of specific targets 501, 502, 503, 504, 505. In these examples, the specific targets 501, 502, 503, 504, 505 are shown as location or regions in the traffic scenario. However, in other examples, the targets 501, 502, 503, 504, 505 could include additional state-related information, such as velocity or orientation. A first specific target 501 is located in a second lane L2 proximate to a first intersection I1. A second specific target 502 is located in a twenty-first lane L21 proximate to a third intersection I3. A third specific target 503 is located between a thirteenth lane L13 and a fourteenth lane L14 proximate to a fourth intersection 14. A fourth specific target 504 is located in a seventeenth lane L17 on an opposite side of the fourth intersection 14 relative to the third specific target 503. The fifth specific target 505 is location in a fiftieth lane L50 off of the seventeenth lane L17.

Figure 8:
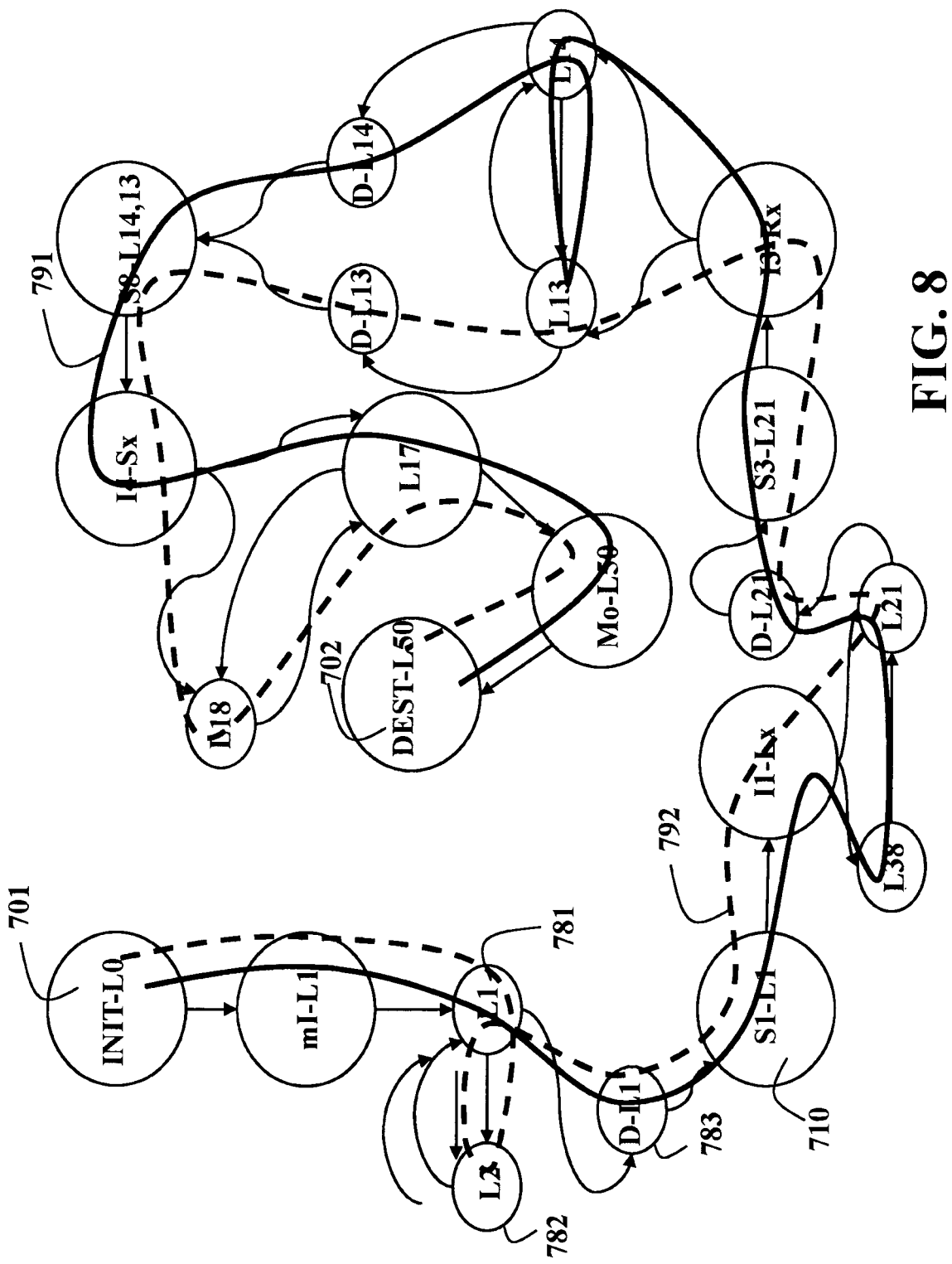
FIG. 8 shows a target graph including multiple choices of intermediate targets from the exemplary traffic scene in FIG. 6, and two alternative selections of a sequence of intermediate targets achieving the final target from the initial target.

The decision-making module 302 can arrange the intermediate targets in a target graph as shown in FIG. 8. The target graph obtained from specific and optional targets includes multiple paths that travel from the initial node 701 to the final node 702, such as first path 791 and second path 792. In the example of FIG. 8, the nodes indicate road locations corresponding to the road location of FIGS. 6 and 7, with names as L1 for lane 1, I1 for intersection 1, and S1 for stop area 1, as prototypical examples. The decision-making module 302 of FIG. 3 determines an actual path by selecting at each time the next intermediate target among the targets that are successors of the current intermediate target in the path. For example, from the first intersection I1, the ego-vehicle 410 may then travel to either the twenty-first lane L21 or the thirty-eighth lane L38. Over time, this process of choosing successive intermediate targets results in a sequence of intermediate targets. For example, FIG. 8 shows the construction of allowed sequence of targets as used in some embodiments of the present disclosure in the exemplary traffic scene in FIG. 6.

When deciding on an intermediate target to achieve, the decision-making module 302 of FIG. 3 must also account for the current traffic. For instance, referring to FIG. 9, along trajectory 603, an intermediate target 607 is dictated by the presence of a slow-moving vehicle 620 in the current lane, requiring a change in lane. The decision-making module 302 must also account for the current vehicle state, such as vehicle position, velocity, and heading (or orientation) of the ego-vehicle.

Figure 9:
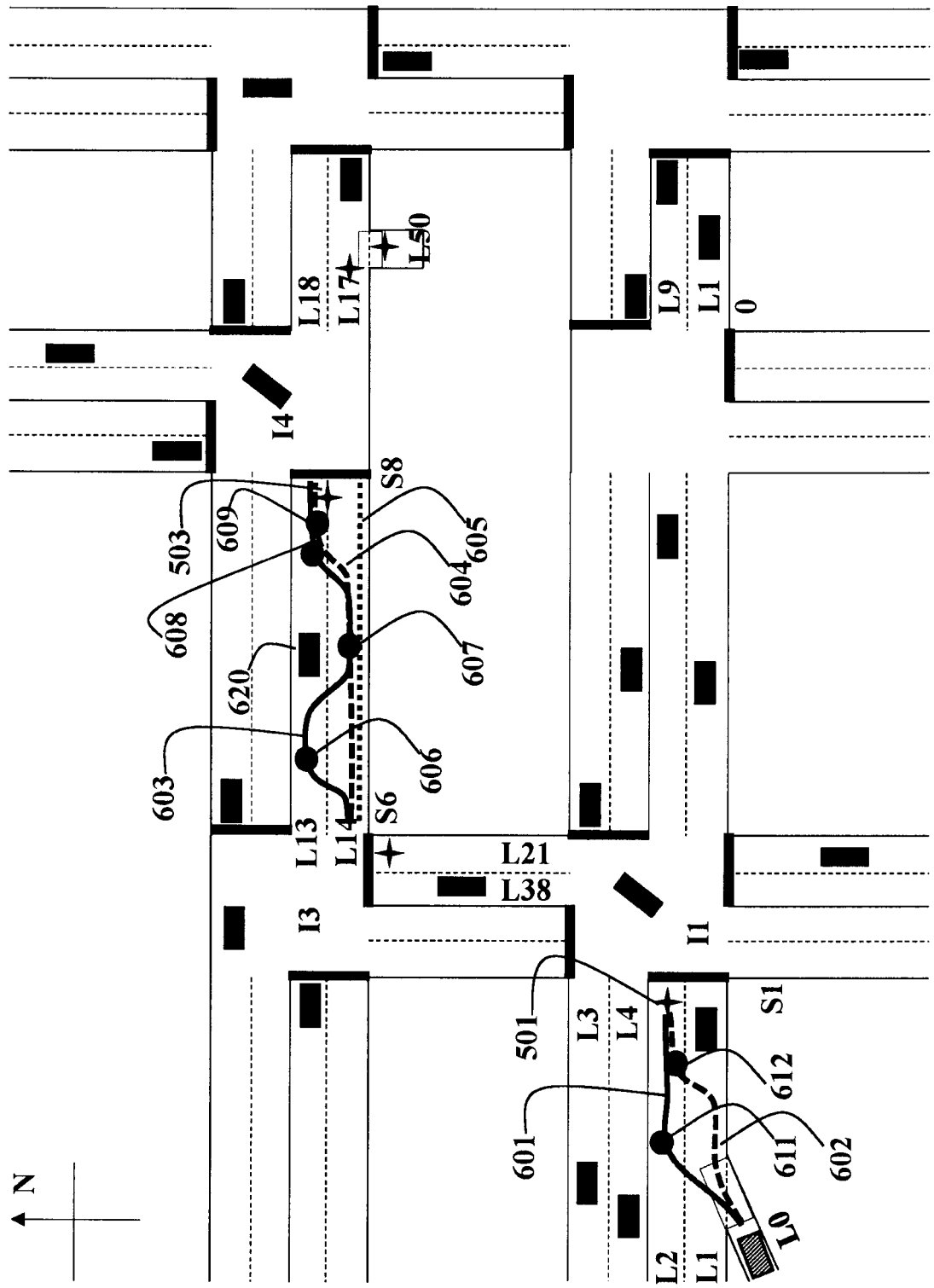
FIG. 9 illustrates trajectories as used in some embodiments of the present disclosure to connect targets according to an exemplary traffic scene.

For instance, in order to achieve the specific target 501 shown in FIGS. 7 and 9, lane change targets 611, 612 must be such that the lane changes can be completed in the necessary space considering the current vehicle velocity and steering capabilities. Thus, the decision-making module 302 evaluates what intermediate targets can be reached based on traffic conditions, and the need to achieve the next specific target. Based on this evaluation, the decision-making module 302 provides to the planning and control module 303 one or more targets that are achievable based on the current state of the vehicle and the traffic conditions and from which the next specific target can be achieved. If no intermediate targets satisfy these requirements, the decision-making module 302 issues a warning error which enables recovery actions, such as requiring the driver to take control or bringing the vehicle to a safe stop.

Still referring to FIG. 8, the selection of the intermediate targets that are to be tested for admissibility based on the state of the current vehicle and traffic conditions and from which the next specific target can be achieved is determined based on the target graph. At any point in time, the current intermediate target indicates the node of the graph that is currently active. From there, decision-making module 302 selects the intermediate target for the next time period, which results in either (1) keeping the current intermediate target, and hence the same node of the graph, or (2) changing to a different intermediate target, among those associated with nodes of the graph that are successors to the node associated to the current target. For instance, in FIG. 8, for a vehicle that has current intermediate target of driving on lane L1, and hence is in node 781 in the target graph, the decision-making module 302 may decide to (1) keep driving in lane L1, 781, or to (2) change lanes to L2, 782, or to (3) start decelerating in lane L1, 783. But it cannot directly stop at stop line S1, in lane L1, 710, because there is no direct target transition from driving in the first lane (L1) 781 to being stopped at the first stop line (S1) 710 without first decelerating in the first lane (L1) 781.

Based on the graph, multiple choices of the intermediate target for the next period may be possible. Hence the target transitions are non-deterministic, i.e., they are not uniquely specified by the target graph. However, additional information needs to be considered, including the current state of the vehicle and traffic information, along with the achievement of the next specific target. Then, each target is associated with vehicle and traffic conditions that makes it achievable.

In this disclosure, it is realized that a trajectory of a maneuver corresponding to a driving decision may be defined as a series of parameters 104. Broadly, a driving decision defines a desired outcome for the ego-vehicle 10, such as changing lanes, following a lane, stopping, turning left, turning right, slowing down, speeding up, etc. A maneuver relates to the action(s) taken by the ego-vehicle 10 to execute the driving decision. A trajectory defines a series of locations to perform the maneuver. The trajectory may be generated by a trajectory-generating function 102 based on the desired maneuver. In some examples, a trajectory may be created by fitting motion data 138 to a parametric dynamical model 140. In further examples, at least one of the trajectory-generating functions 102 is predefined prior to control admissibility testing of one or more driving decisions.

A parameterized trajectory may be defined by parameters 104 such as target lateral displacement 130, target longitudinal displacement 132, target velocity 134, target heading 136, etc. Collectively, the series of parameters 104 can be considered a parameter vector 106. Each of the individual parameters 104 may have a value (such as a target lateral displacement 130 of six feet or a target velocity 134 of twenty miles per hour). Accordingly, the parameter vector 106 may also be considered as having a value representing the combination of the individual parameters 104 forming the parameter vector 106. In some examples, a parameter vector 106 may be a low-dimensional vector comprising only one or two parameters 104. In other examples, the parameter vectors 106 may be more complex vectors incorporating three or more parameters 104. In some examples, the values of one or more of the parameters 104 may be a steady state target value generated by one of the multiple trajectory-generating functions 102.

In further examples, a trajectory-generating function 102 may be obtained by combining a motion model of the motion planning submodule 304 with a vehicle control model of the vehicle control submodule 305. In this example, the value of the parameter vector 106 may be a setpoint of the control unit 100, such that the motion model and the vehicle control model will generate a trajectory-generating function to reach the setpoint.

By representing the trajectories as parameter vectors 106, the control unit 100 can determine whether a maneuver is feasible (also known as admissibility testing) by checking whether there exists a value of the parameter vector 106 for a trajectory-generating function 102 of the vehicle 10 for which the current state 116 of the vehicle 10 is inside certain specific regions and outside other specific regions. This determination will be explained in more detail regarding FIGS. 10-12.

Figure 10A:
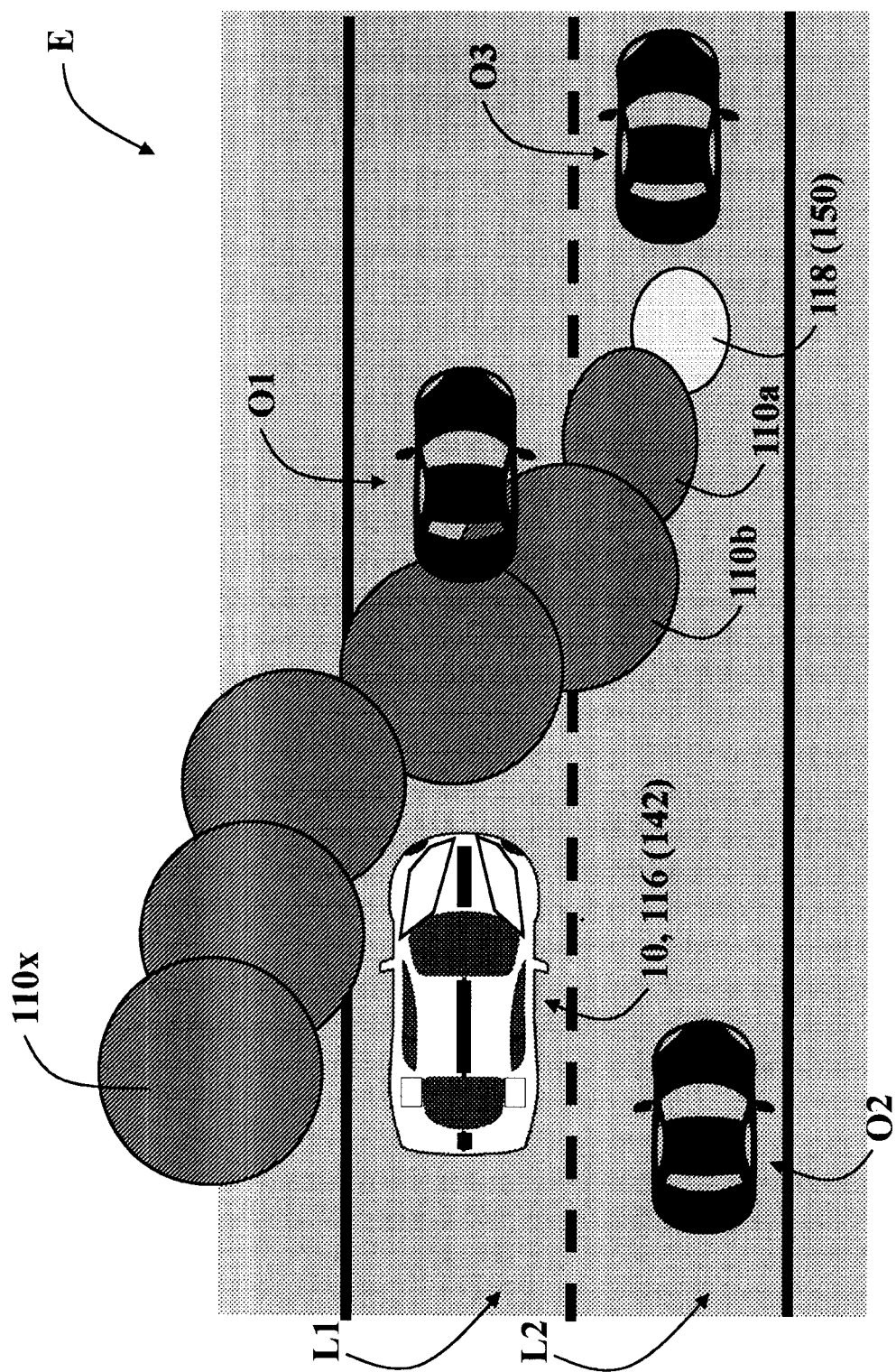
FIG. 10A illustrates achieving regions from which a target region is achieved by a certain maneuver for a certain value of a parameter vector at the end of certain time intervals for an exemplary traffic scenario.

FIG. 10A shows an example traffic scenario corresponding to FIG. 4A. In FIG. 10A, where the ego-vehicle 10 drives on a first lane L1 on a road where there is also an available second lane L2 for driving. The traffic scenario also includes three obstacles O1, O2, O3 embodied as other vehicles on the road. As shown in FIG. 5, the driving decision to check is to change lanes from the first lane L1 to the second lane L2, completing the lane change in a target range of positions 150 of a target region of states 118. The target region of states 118 indicates the desired properties and characteristics of the vehicle 10 following the execution of the maneuver. The target region of states 118 may include, for example, the target range of positions 150, a target range of velocity 152, a target range of acceleration 154, and/or a target range of heading 156. As shown in FIG. 10A, the target range of positions 150 is positioned in the second lane L2 slightly behind the third obstacle O3. In another example, if the driving decision involves stopping (such as at a stop sign, crosswalk, or traffic signal), the target velocity 152 may be zero.

Figure 10B:
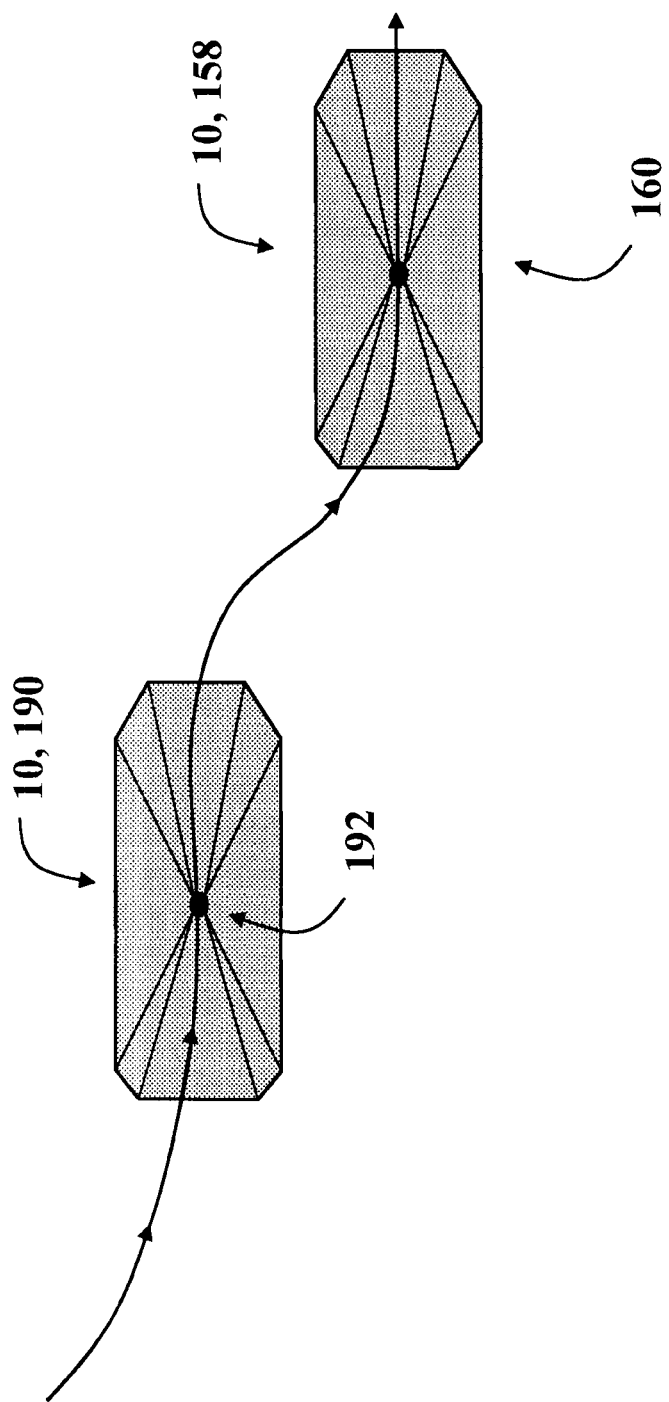
FIG. 10B illustrates motion of an ego-vehicle to a target polyhedron, in accordance with an example.

In some examples, as illustrated in FIG. 10B, the target range of positions 150 of the ego-vehicle 10 may be represented as a target polyhedron 158, and the current location 142 of the ego-vehicle 10 may be represented as a current location polyhedron 190. The target polyhedron 158 may be defined about a target center location 160, and the current location polyhedron 190 may be defined about a current center location 192. The target center location 160 may move according to a motion prediction model 162 executed by the motion planning module 304.

In this disclosure, it is realized that the determination of whether a next intermediate target of a series of intermediate targets (as shown in FIG. 8) is feasible may be made by checking whether a value of the vector of parameters for a trajectory generating function of the vehicle exists for which the state of the vehicle and parameter vector of the vehicle are inside certain specific regions and outside other specific regions. In the scenario of FIG. 10A, the next intermediate target to check is to change lanes from the first lane L1 to the second lane L2, completing the lane change in the target range of positions 150. The method in this disclosure constructs an achieving sequence 108 of achieving regions 110 (each region corresponding to a state of the vehicle 10 and one or more values of the parameter vector 106) from which the vehicle 10, moving on the trajectory according to one of the trajectory-generating functions 102, reaches a target region of states 118 at the end of a specific time interval. In FIG. 10A, achieving region 110a is the set of vehicle states (including position on the road) that reach the target range of positions 150 for one value of the parameter vector 106 at the end of a first time interval. Achieving region 110b is the set of vehicle states that reach the target range of positions 150 for the same value of the parameter vector at the end of a second time interval longer than the first time interval. Achieving region 110x is the set of vehicle states that reach the target range of positions 150 for the same value of the parameter vector at the end of a third time interval that is the maximum time interval considered. The maximum time interval considered in the control system may be referred to as a prediction horizon 114. Any number of additional achieving regions 110 may be generated to complete the path between the first region 110a and the last region 110x.

In the example of FIG. 10A, the current location 142 of the current state 116 of vehicle 10 is outside all achieving regions 110a, 110b, 110x, and similar regions. Hence, vehicle 10 is not able to complete the lane change maneuver from the first lane L1 to the second lane L2 ending in target range of positions 150 according to the trajectory-generating function 102 for the selected value of the parameter vector 106. It is worth noting that the decision making determines the feasibility of driving decision by the method of this disclosure without actually generating the trajectory, but only by checking membership of the current state 116 of the vehicle and value of the parameter vector 106 in the achieving regions 110. For clarity, it should be noted that the aforementioned achieving sequence 108 does not factor in potential collisions with obstacles O1, O2, O3. Rather, the achieving sequence 108 only considers reaching the target region of states 118 given the current state 116 of the ego-vehicle 10 and the parameter vector 106 values.

In some examples, the sequence 108 of achieving regions 110 is constructed such that, if a value of the parameter vector 106 of the achieving sequence 108 is applied to a corresponding state value, the target range of positions 150 is entered within a fixed number of achieving steps 164. The fixed number of achieving steps 164 is shorter than a length of the maneuver. For example, in FIG. 10A, the first achieving region 110a is defined as one step away from the target range of positions 150. Similarly, the second achieving region 110b is defined as two steps away from the target range of positions 150. In either case, both the first and second achieving regions 110a, 110b would reach the target range of positions 150 in a shorter distance than the length of the entire maneuver.

In some examples, the achieving sequence 108 of achieving regions 110 will be limited by additional constraints imposed by traffic rules, such as speed limits, road boundaries, etc. These constraints can be included in generating the achieving sequence 108 by properly trimming the states and values of the parameter vector that violate said traffic rules from the achieving sequence 108. Hence, in these examples, location within an achieving region 110 also ensures satisfaction of said traffic rules.

Figure 11:
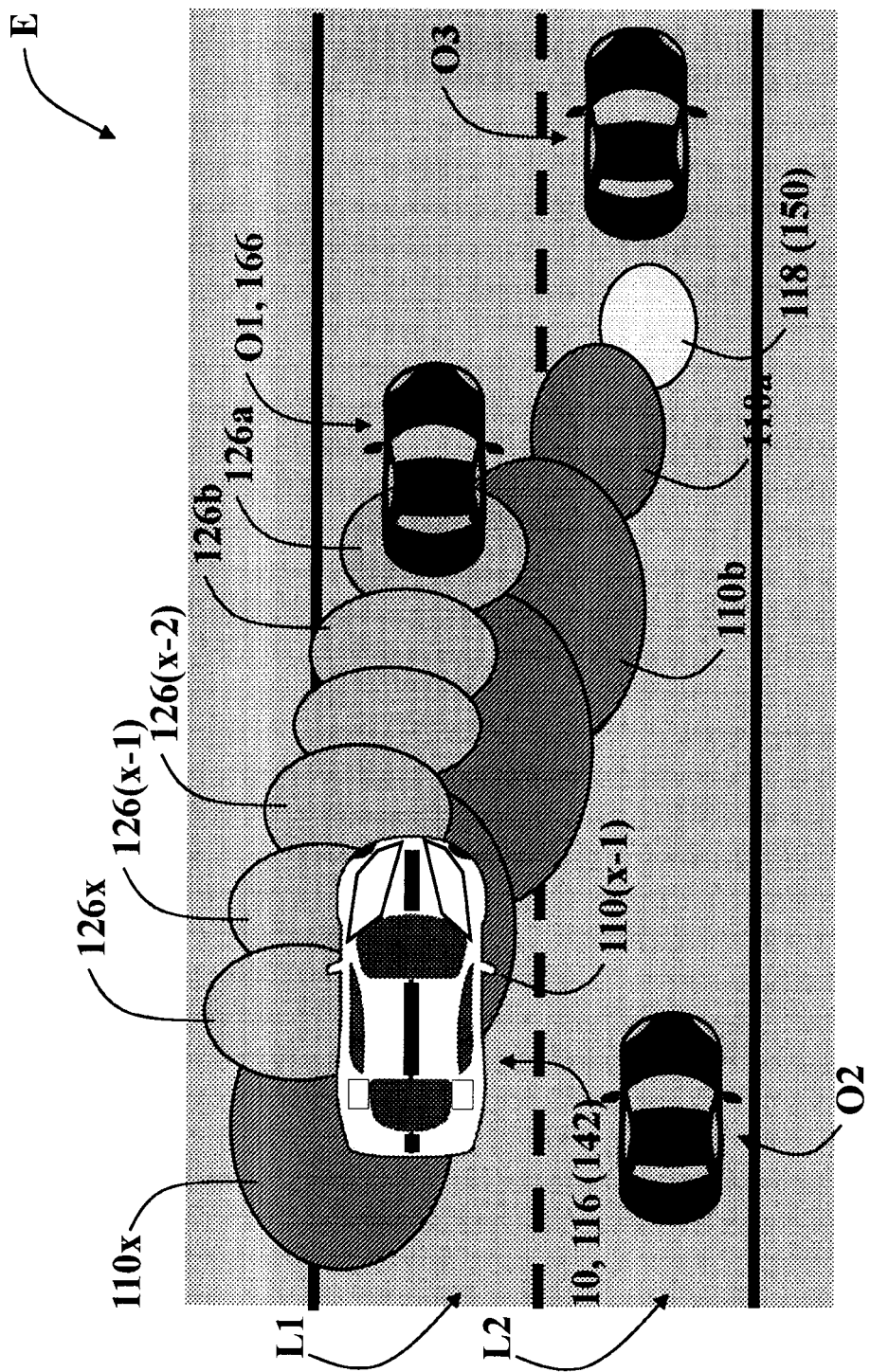
FIG. 11 illustrates colliding regions from which collision with an obstacle occurs by a certain maneuver for a certain value of the parameter vector at the end of certain time intervals for an exemplary traffic scenario.

Further, in this disclosure it is realized that by using the parameterized trajectory-generating function 102, as opposed to a model of vehicle motion with inputs, the same method can be used to compute a colliding sequence 124 of regions 126 of states and parameter vector values from which the vehicle 10 moving according to one of the trajectory-generating functions 102 collides with one obstacle O at the end of a specific time interval. In FIG. 11, colliding region 126a is the set of vehicle states (including position) that collides with first obstacle O1 for another value of the parameter vector 106 at the end of a first time interval. Colliding region 126b is the set of vehicle states that collide with the first obstacle O1 for the same value of the parameter vector at the end of a second time interval longer than the first time interval. Colliding region 126x is the set of vehicle states that collide with the first obstacle O1 for the same value of the parameter vector 106 at the end of a third time interval that is the maximum time interval considered (the prediction horizon 114). Anyone number of additional colliding regions 126 may be generated to complete the path between the first region 126a and the last region 126x. The colliding regions 126 are determined based on one or more observed obstacle states of the first O1 collected over time as described in relation to FIG. 4A.

In the example of FIG. 11, the current location 142 of the current state 116 of the vehicle 10 is inside two achieving regions 110x, 110(x-1). Hence, the ego-vehicle 10 is able to complete the lane change maneuver from the first lane L1 to the second lane L2 ending in the target range of positions 150 according to the trajectory-generating function 102 for the selected value of the parameter vector 106. However, the current location 142 of the vehicle 10 is also inside colliding region 126x, which is the region from which the vehicle collides with obstacle O1 at the end of the maximum time interval. Similarly, the vehicle is also inside of two additional colliding regions 126(x-1), 126(x-2). Hence, while the vehicle 10 may complete the lane change maneuver from the first lane L1 to the second lane L2 ending in target range of positions 150 according to the by trajectory-generating function 102, the vehicle will also collide with obstacle O1 for the selected value of the parameter vector 106. Accordingly, the decision-making module 302 will not designate the illustrated driving decision (lane change) as admissible, and the driving decision will not be implemented by the other modules and submodules of the control unit 100.

In some examples, the sequence 124 of colliding regions 126 is constructed such that if a value of the parameter vector 106 of the colliding sequence 108 is applied to a corresponding state value, the obstacle region 166 is entered within a fixed number of colliding steps 180. The fixed number of colliding steps 180 is shorter than a length of the maneuver. For example, in FIG. 11, the first colliding region 126a is defined as one step away from the obstacle region 166 corresponding to the first obstacle O1, wherein the step is the unitary size of time as used in the decision-making module, sometimes also called sampling period or decision cycle period. Similarly, the second colliding region 126b is defined as two steps away from the obstacle region 166. In either case, both the first and second colliding regions 126a, 126b would reach the obstacle region 166 in a shorter distance than the length of the entire maneuver.

Figure 12:
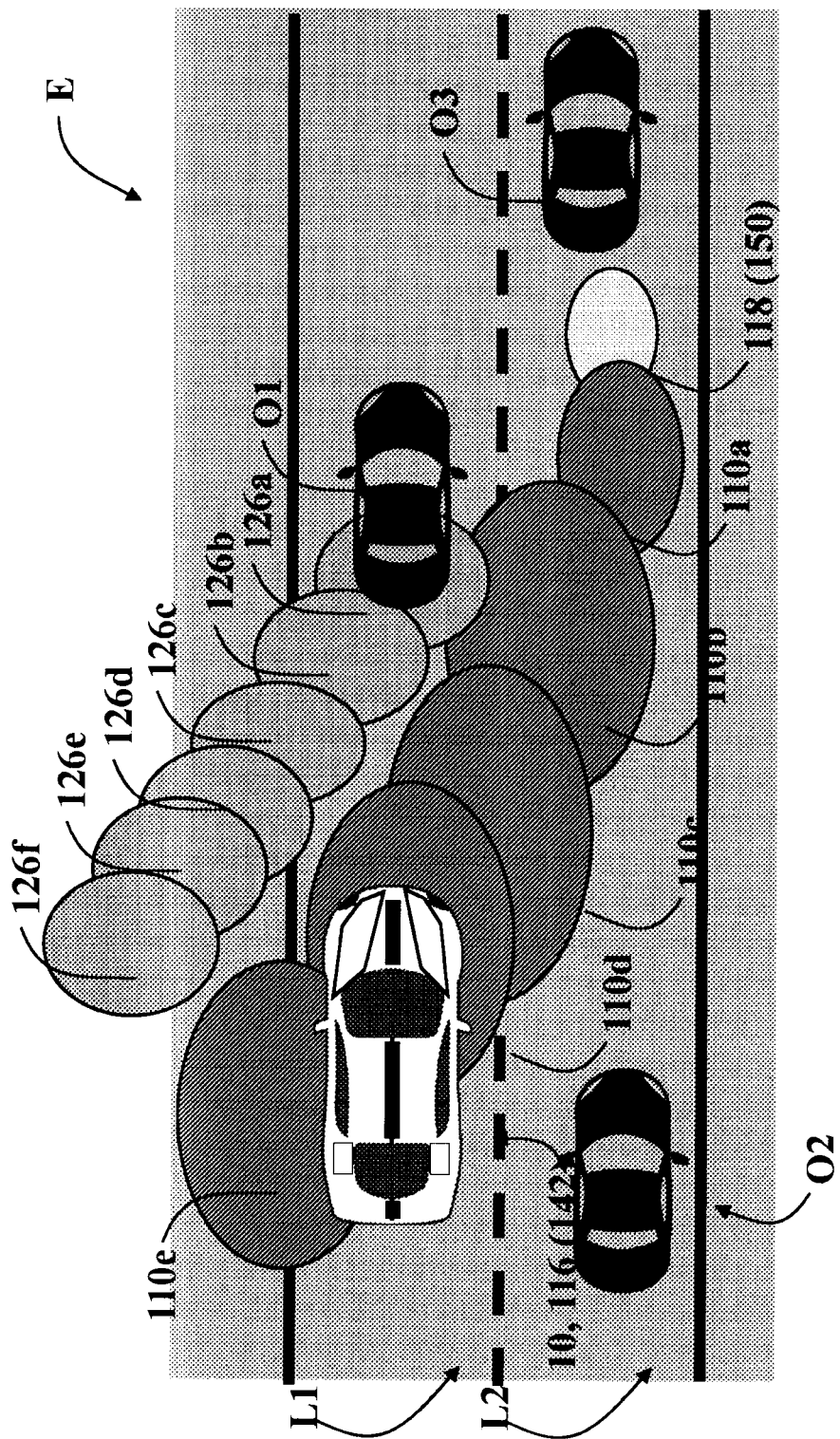
FIG. 12 illustrates a situation where the vehicle of FIGS. 10 and 11 achieves the target region by a certain maneuver for a certain value of the parameter vector at the end of certain time intervals and the vehicle avoids an obstacle by the certain maneuver for the certain value of the parameter vector at the end of all the certain time intervals for an exemplary traffic scenario.

FIG. 12 shows a scenario where there is only one obstacle O1 and the lane change from the first lane L1 to the second lane L2 is actually feasible. For a value of the parameter vector 106, the colliding regions 126a-126f of states that collide with the obstacle 803 at the end of certain time intervals are shown, as well as the achieving regions 110a-110e of states that reach the target range of positions 150 at the end of certain time intervals. Vehicle 10 is outside of the colliding regions 126a-126f so collision will not occur, for the value of the parameter vector 106, from the current state 116 of the vehicle 10. Also, vehicle 10 is inside at least one of the achieving regions 110a-110f, so the target range of positions 150 is reached for the value of the parameter vector 106 from the current state 116 of the vehicle 10. Since target range of positions 150 is reached and collisions do not occur, the maneuver and driving decision of lane change to the second lane L2 are feasible.

Figure 13:
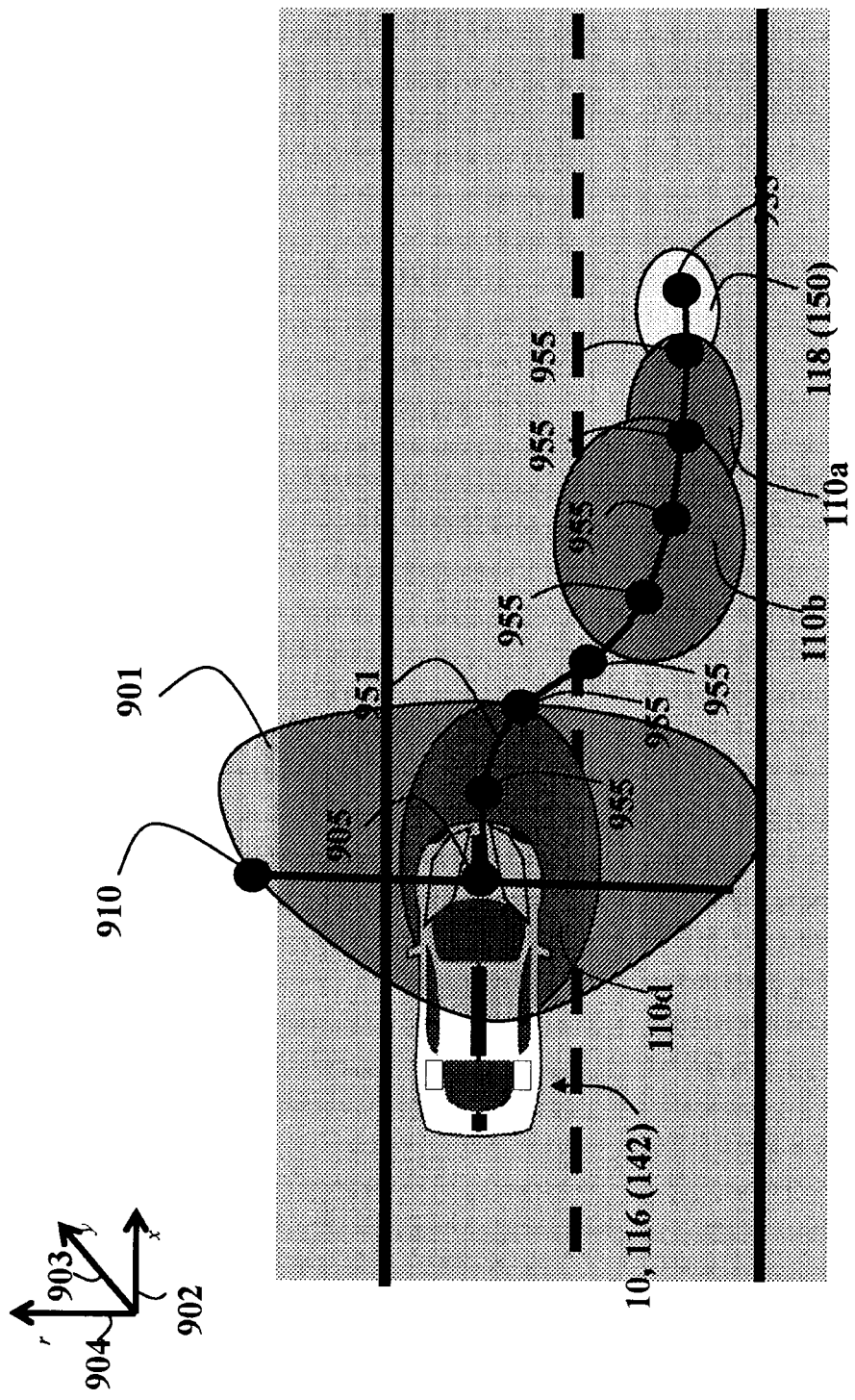
FIG. 13 shows a region of vehicle states and parameter vector values for which the vehicle achieves the target region and does not collide with the obstacle, the trajectory in achieving the target region, and the waypoints on such trajectory, in accordance with an example.

Further, the method of this disclosure does not require separated computations of the regions of vehicle states for each value of the parameter vector 106, but rather directly computes the joint regions of states and parameter vector values. FIG. 13 shows the joint region of states and parameter vector values for achieving region 110d shown in FIG. 13. The achieving region 110d is lifted by one dimension, where the x-axis 902 and y-axis 903 define the coordinates of the current location 142 of the vehicle 10, and the third axis 904 is the axis of the parameter value (r). Thus, the joint region of the state and parameter vector values 901 is lifted by one dimension with respect to the region of states 110d. Given the current vehicle position point 905, the segment of parameter vector value for the current position and variable parameter vector value that is contained in the joint region of states and parameter vector values, represents all the parameter vector values for which the current vehicle state is inside the region 901, or alternatively, all the values of the parameter vector 106 for which the vehicle state is inside the region 832b.

Thus, based on such selection, the decision-making module 302 of FIG. 3 determines one or more targets that are allowed to be next intermediate targets and provide them to the planning and control module 303.

When multiple parameter vector values result in a feasible maneuver, the decision making may also choose an optimal value 184 of the parameter vector 106 as the value that optimizes a certain objective, for instance minimizes the time to accomplish the maneuver, minimizes the energy usage, maximizes the driver comfort, minimizes the aggressiveness of the maneuver, minimizes the amplitude of the value of the parameter vector 106, minimizes velocity of the maneuver, or maximizes the robustness of the maneuver. For instance, in FIG. 13, the decision making can select the maximum value of the parameter that is admissible 910, which provides fastest lane change. In some examples, the optimal value 184 may be determined by optimizing cost function 186. The robustness of the maneuver may be defined as the maximum value such that any deviation of amplitude equal or smaller than such maximum value added or subtracted to the value of the parameter vector 106 still results in an admissible maneuver.

Using the current state of the 116 vehicle 10 and the selected optimal value 184 of the parameter vector 106, the decision-making module 302 can use the trajectory-generating function 102 to compute a specific trajectory 951, which is already ensured to achieve the target range of positions 150 and avoid collision, and from that extracts one or more waypoints 955 to provide to the planning and control module 303.

Upon receiving one or more current driving decisions, and possibly the waypoints 955, the motion planning submodule 304 within the planning and control module 303 of FIG. 3 attempts to compute a trajectory for each driving decision and selects the current best trajectory among all those that are successfully computed, according to a numerical value determined by a cost function including at least one specified criterion. In general, the motion planning submodule 304 computes a trajectory using a more refined and precise function or model than that used in the decision making, and often for a shorter time interval, to further adjust to varying environment and traffic conditions. Then the motion planning submodule 304 provides the trajectory to the vehicle control submodule 305 which computes commands, e.g., steering angle and acceleration, to make the vehicle follow the trajectory, and send the commands to the actuator control submodule 306 which manipulate the actuator in the vehicles, e.g., engine airflow and spark timing, steering motor torque or voltage, brake pump pressure or current, to achieve the commands.

Figure 14:
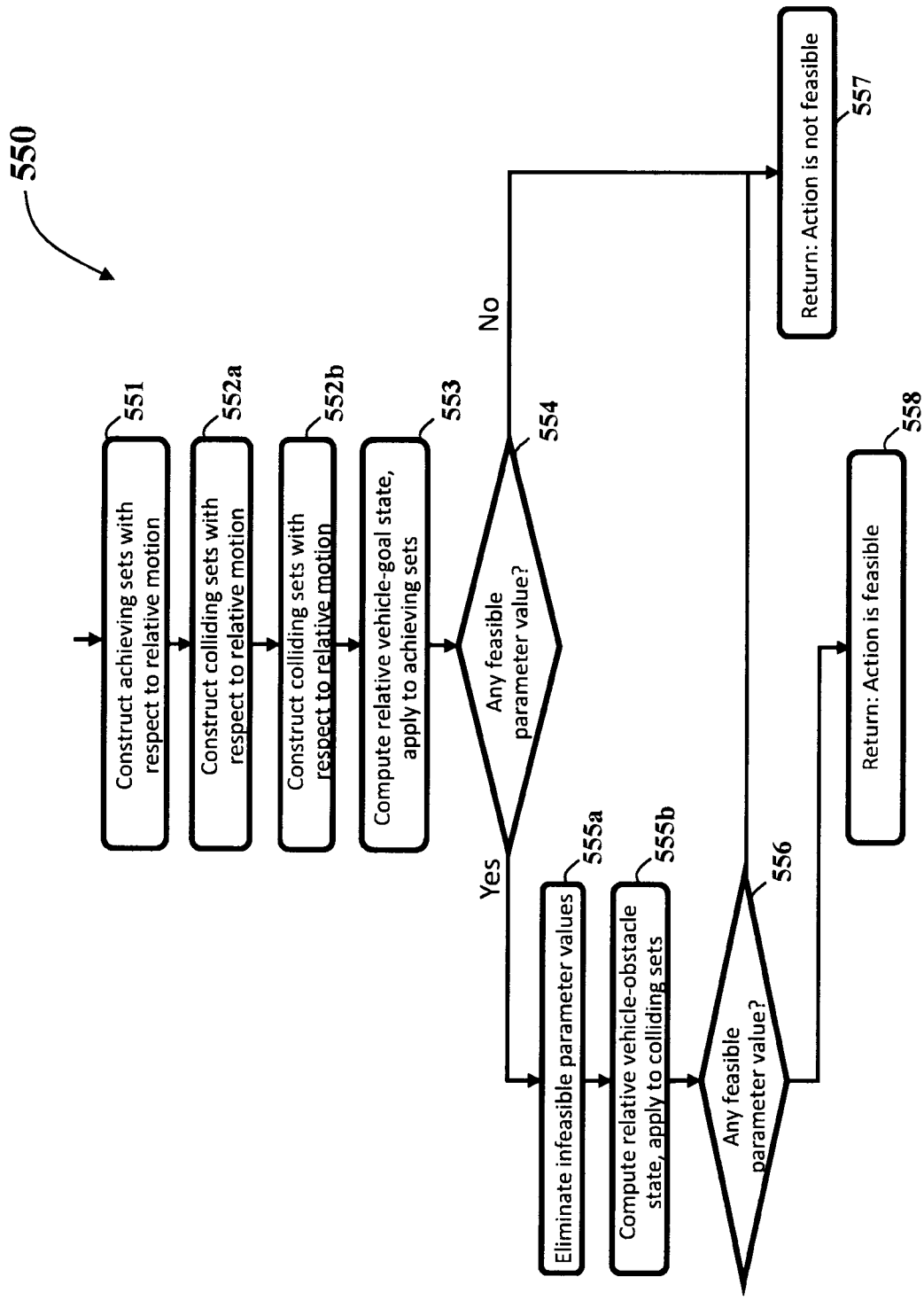
FIG. 14 illustrates a block diagram of a method for determining safe and feasible driving decisions, in accordance with an example.

FIG. 14 illustrates a block diagram of a high-level method 550 for determining safe and feasible (also referred to as admissible) actions (also referred to as driving decisions). As described above, the method 550 begins by, in step 551, constructing an achieving sequence 108 (sets) of achieving regions 110. The method 550 then, in steps 552a, 552b constructs one or more colliding sequences 124 (sets) of colliding regions 126. The method 550 then, in step 553, computes the current state 116 of the vehicle 10 and applies the current state 116 over the achieving regions 110. The method 550 then, in step 554, determines if any value of the parameter vector 106 exists such that it is feasible for the vehicle 10 to reach a target region of states 118. If not, in step 557, the driving decision is designated to be not feasible. If so, in step 555a, the method 550 eliminates the infeasible values of the parameter vector 106, and, in step 555b, applies the remaining values to the colliding regions 126. If, following the application to the colliding regions 126, values of the parameter vector 106 exist to reach the target region of states 118 without entering the colliding regions 126 in step 506, the driving decision is designated as feasible in step 558. If not, in step 557, the driving decision is designated to be not feasible. In some examples of the method 550 of FIG. 14, the method 550 ceases to run as soon as a feasible value of the parameter vector 106 is determined. In other examples, the method 550 determines all feasible values of the parameter vector 106 within a given range.

Trajectory-Generating Functions

Conventionally, the motion of a vehicle may be described by a dynamic function. This dynamic function depends on the current state of the vehicle and the input applied at any step to determine the next state:

$$x(t+1) = f_u(x(t), u(t)) \tag{1}$$
$$y(t+1) = h_u(x(t), u(t))$$

where x is the state vector, u is the input vector, and/is the time step. In this disclosure, it is realized that complexity of the region computation is greatly reduced if we represent the motion of the vehicle by a parameter-dependent trajectory generating function:

$$x(t+1) = g(x(t), r) \tag{2}$$
$$p(t) = h(x(t))$$

where r is the parameter vector that is constant during the trajectory generation process, and $p=[p_x \ p_y]'$ is the position of a reference point of the vehicle. The reference point may be the center of gravity of the vehicle, the center of the front axle of the vehicle, etc. Hence, while equation (1) requires the initial state and the input vectors at all time steps for specifying a trajectory, equation (2) only requires the initial state and one value of the parameter vector. There are multiple ways to obtain the parameter-dependent trajectory generating function of equation (2).

For instance, the parameter-dependent trajectory-generating function can be obtained directly by recording data of different vehicle behavior as function of a specific parameters. Alternatively, the parameter-dependent trajectory-generating function can be constructed from equation (1) by defining a function that assigns the input by a specific function of the parameter:

$$x(t+1) = g(x(t), r) = f_u(x(t), \kappa(x(t), t, r)) \tag{3}$$

where k may be a feedback and or feedforward control function based on parameter r.

Examples of trajectory-generating functions include the velocity controlled longitudinal vehicle model:

$$\dot{p}_x = v_x \tag{4a}$$
$$\dot{v}_x = -\frac{1}{\tau_v} v_x + \frac{1}{\tau_v} r_v$$

where $p_x$, $v_x$ are the longitudinal position with respect to the center lane and velocity, $r_v$ is the velocity command, and $\tau_v > 0$ is a time constant. In equation (4a), the parameter is $r_v$.

Another example of a trajectory-generating function is the position controlled lateral vehicle model:

$$P_y(s) = G_y(s) \frac{r_y}{s} \tag{4b}$$
$$G_y(s) = \frac{1}{\left(\frac{s^2}{\omega_y^2} + 2\frac{\zeta_y}{\omega_y} s + 1\right) \cdot (s\tau_y + 1)}$$

where $G_y$ is a transfer function expressed in Laplace domain from lateral position command $r_y$ to lateral position with respect to the center lane $p_y$, which in equation (4b) is described by a 3rd order system where $\omega_y$ and $\zeta_y$ are the second order system natural frequency and damping, respectively, and $\tau_y$ is a time constant. In equation (4b), the parameter is $r_y$.

Another example of a trajectory-generating function is the constant deceleration model:

$$\dot{p}_x = v_x \tag{4c}$$
$$\dot{v}_x = -r_a$$

where $r_y$ is the deceleration rate, which is also the parameter of (4c).

Representation of Obstacle and Targets

The target region of states Γ of each next intermediate target is defined by the couple:

$$\Gamma = \left(\tilde{\mathcal{P}}_g, \Sigma_g\right) \tag{5a}$$

where $\tilde{\mathcal{P}}_g$ is the target area and $\Sigma_g$ is the target motion model. The range of target positions is the area of the target and it may be defined as:

$$\tilde{\mathcal{P}}_g = [g_x, g_y]' \oplus \bar{\mathcal{P}}_g \tag{5b}$$

where $g=[g_x \ g_y]'$ is the position of the center of the target region of states and $\bar{\mathcal{P}}_g$ is the spatial extent of the target around the center. In some embodiments of the present invention the range of target positions is lifted with at least one among the ranges of target velocities, range of target accelerations and range of target headings to obtain the target region of states. The target motion model describes the dynamic evolution of the center of the target region of states as a function:

$$x_g(t+1) = g_g(x_g(t)) \quad (5c)$$

$$g = h_g(x_g(t))$$

For instance the constant velocity, constant lane motion $$\dot{g}_x = v_g \quad (5d)$$

$$\dot{v}_g = 0$$

$$\dot{g}_y = 0,$$

where $v_g$ is the target region velocity with respect to the center lane. Each target is associated with a maneuver to attempt achieving it. The maneuver is described by one specific trajectory-generating function (according to equation (4)) that must enter the target area for an appropriate value of the parameter vector for the next intermediate target to be feasible.

An obstacle O is defined by the following couple:

$$O = \left(\tilde{\mathcal{P}}_o, \Sigma_o\right) \quad (6a)$$

where $\tilde{\mathcal{P}}_o$ is the target area and $\Sigma_o$ is the target motion model. The target area is the area of the target and it may be defined as $$\tilde{\mathcal{P}}_o = [o_x o_y]' \oplus \overline{\mathcal{P}}_o \quad (6b)$$

where $O=[O_x\ O_y]'$ is the position of the center of the obstacle and $\overline{\mathcal{P}}_o$ is the spatial extent of the obstacle around the center. Note that the spatial extent of the obstacle area may be defined as the positions around the center for which collision occurs with respect to the reference point of the vehicle. Accordingly, the spatial extent may account for both the actual obstacle spatial extent as well as the vehicle spatial extent. The obstacle motion model describes the dynamic evolution of the obstacle center as a function:

$$x_o(t+1) = g_o(x_o(t)) \quad (6c)$$

$$o = h_o(x_o(t))$$

For instance, the constant velocity, constant lane motion $$\dot{o}_x = v_o \quad (6d)$$

$$\dot{v}_o = 0$$

$$\dot{o}_y = 0,$$

where $v_o$ is the obstacle region velocity with respect to the center lane. The maneuver associated to the next intermediate target must enter the target area for an appropriate value of the parameter vector without entering the obstacle area for any obstacle for the next intermediate target to be feasible.

Set Construction

In order not to duplicate computations at all executions, for each of the intermediate target maneuvers and each of the obstacles, relative models may be built from the vehicle trajectory generating function and the targets and obstacles in discrete time with sampling period $T_s$, $$\Delta x^{(i),h}(t+1) = g_\Delta^{(i),h}\left(\Delta x^{(i),h}(t), r^{(i)}\right) \quad (7a)$$

$$\Delta p^{(i),h}(t) = h_\Delta^{(i),h}\left(\Delta x^{(i),h}(t)\right)$$

where $\Delta x^{(i),h}$ and $\Delta p^{(i),h}=[\Delta p_x^{(i),h}\ \Delta p_y^{(i),h}]'$ denote the relative states and the relative position of the ego-vehicle with respect to the target (h=0) or obstacle (h>0) in maneuver i, respectively. For instance, for the case of the linear models in equations (4), (5d), (6d) this results in:

$$\Delta x_{k+1|t}^{(i),h} = \Delta A^{(i),h} \Delta x_{k+1|t}^{(i),h} + \Delta B^{(i),h} w_{0|t}^{(i),h} \quad (7b)$$

$$w_{0|t}^{(i),h} = \Psi^{(i),h} x_t^h + r_{0|t}^{(i)}$$

Next, we construct the regions of relative states and parameter values such that a collision occurs within certain time intervals, specifically a number of sample periods k less than a finite time number N from current sampling period t. Then, we construct the set of relative states and parameter values that enter into the spatial extent of the obstacle or targets in one step by the iteration:

$$\chi_b^{(0)} = \mathcal{P}_b \quad (7c)$$

$$\chi_b^{(k+1)} = Pre(\chi_b^{(k)})$$

where b=g for a target (goal) and b=o for an obstacle, $\mathcal{P}_b$ is the spatial extent of the obstacle/target lifted to the dimension of the relative state plus the dimension of the parameter vector. The operator pre-computes the region of states and parameter vector values that end up into the argument regions by executing the relative models (7a) and/or (7b) for one sampling period. Then we obtain:

$$\mathcal{A}^{(k)} = \chi_g^{(k)} \quad (8a)$$

$$\mathcal{C}^{(k)} = \chi_o^{(k)} \quad (8b)$$

where equation (8a) is called achieving region of k steps, the region of relative states and parameter vector values such that the vehicle reaches the region after k steps according to the trajectory generated by the trajectory-generating function from the state computed from the relative state and by selecting the parameter vector value and equation (8b) is called colliding achieving region of k steps, is the region of relative states and parameter vector values such that the vehicle is in collision with the obstacle after k steps according to the trajectory generated by the trajectory-generating function from the state computed from the relative state and by selecting the parameter vector value.

In other embodiments of the present invention, the ego-vehicle must also satisfy other limitations, such as ranges in velocities, position with respect to the center lane, accelerations, etc. In this case, the iteration in equation (7c) is modified to account also for the admissible states of the vehicle with respect to such limitations, by first constructing the set of states $\mathcal{Y}$ that satisfy the limitations, and then modifying the iteration to construct the achieving regions of the target to:

$$\mathcal{X}_a^{(k+1)} = Pre(\mathcal{X}_a^{(k)}) \cap \mathcal{Y} \qquad (7d)$$

Thus, for maneuver i and obstacle h>0, the set of parameter vector values is constructed that cause a collision within, at most, N steps:

$$\mathcal{F}_o^{(i),h}(\Delta x^{(i),h}, x^h) = \left\{ r^{(i)} \in \mathcal{R}^{(i)}: (\Delta x^{(i),h}, r^{(i)}) \notin \bigcup_{k=0}^{N} \mathcal{C}_k^{(i),h} \right\} \qquad (9a)$$

where $x^h$ is the obstacle state, and the set of parameter vector values that reach the target at the end of at most N steps:

$$\mathcal{F}_g^{(i),a}(\Delta x^{(i),0}, x^0) = \left\{ r^{(i)} \in \mathcal{R}^{(i)}: (\Delta x^{(i),0}, r^{(i)}) \in \bigcup_{k=0}^{N} \mathcal{A}_k^{(i),h} \right\}, \qquad (9b)$$

where $x^0$ is the state of the center of the target region of states. Then, the decision-maker determines a maneuver to be feasible if $$\mathcal{F}_g^{(i),n}(\Delta x_t^{(i),0}, x_t^{(i),0}) \cap \left( \bigcap_{h=1}^{n_o} \mathcal{F}_o^{(i),h}(\Delta x_t^{(i),h}, x_t^{(i),h}) \right) \neq \emptyset, \qquad (10)$$

where $n_o$ is the total number of obstacles.

Figure 15:
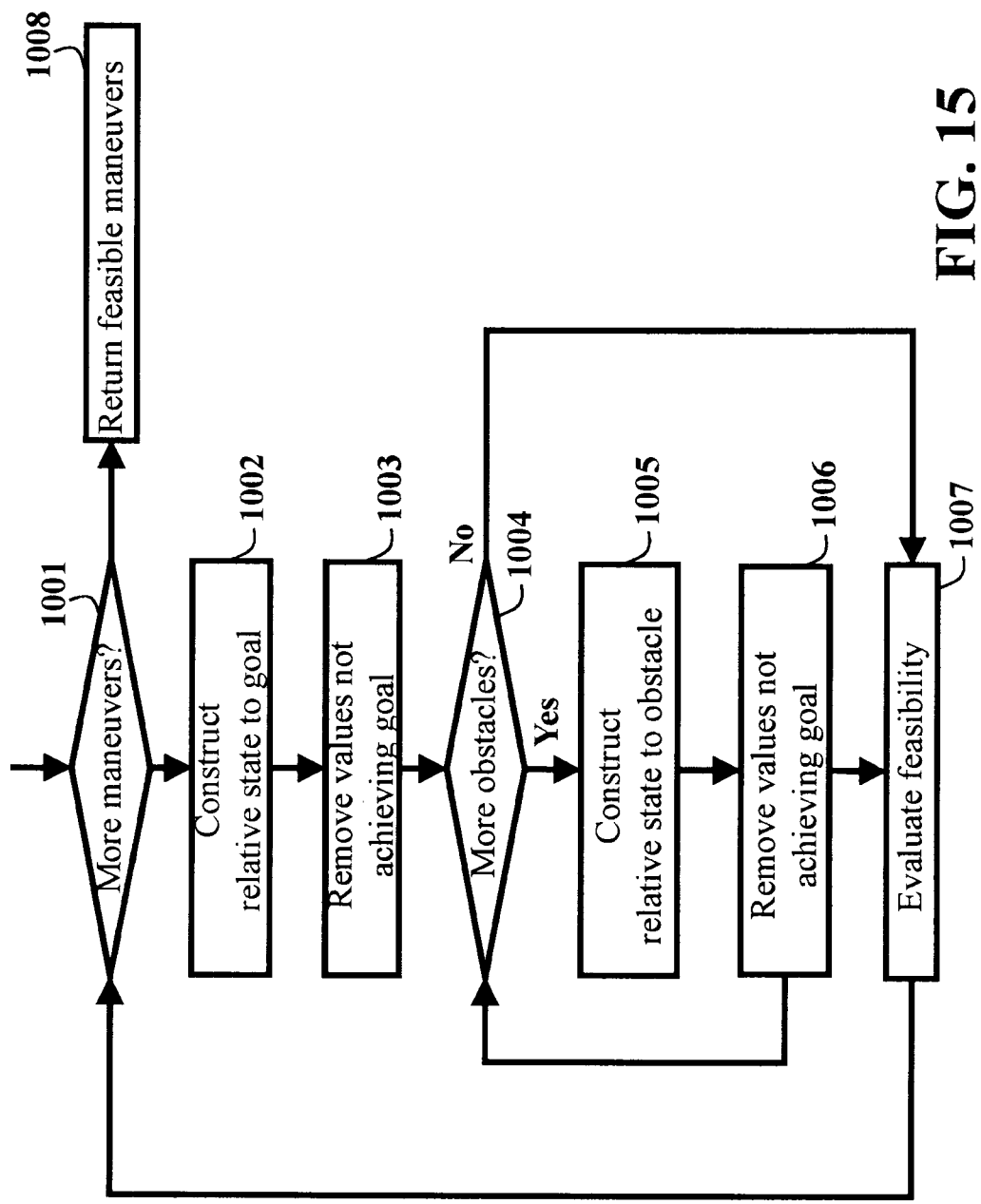
FIG. 15 shows a block diagram of an algorithm for determining feasibility of the maneuvers with respect to achieving targets and avoiding obstacles, in accordance with an example.

FIG. 15 is a block diagram for the computation for the decision-making according to some embodiments of the present invention based on the recognition that it is more efficient to compute the intersections of the sets in equation (10) sequentially, by iteratively reducing the allowed values of the parameter vector values, after each intersection. If, in step 1001, there are more maneuvers to check, for the next maneuver to be checked construct, in step 1002, the relative state with respect to the target, and remove, in step 1003, the values of the parameter vector that do not achieve the target, i.e., are not part of the region $\mathcal{F}_g^{(i),0}$ in (9a). Then, if, in step 1004, there are more obstacles to check, for the next obstacle h construct, in step 1005, the relative state with respect to such obstacle, and remove, in step 1006, the values of the parameter vector that collide with the obstacle, i.e., are not part of the region $\mathcal{F}_o^{(i),h}$ in (9b). If 1004 all obstacles have been checked, the feasibility of the maneuver is evaluated, in step 1007, by checking if any value of the parameter vector remains as not removed, in which case the maneuver is feasible. Then go to the next maneuver and if, in step 1001, all maneuvers have been checked, return, in step 1008, to the motion planner and control module 303 the available maneuvers.

Special Cases of Computation Reduction

In certain cases, a list of values of the parameter vector can be defined and each of them tested in equation (10), for instance, as described by the block diagram in FIG. 15. In certain embodiments of the present invention, the achieving region of k steps and the colliding region of k steps are described by inequalities:

$$h_{A(k)}(r^{(i)}, \Delta x_t^{(i),0}, x_t^{(i),0}) \leq 0 \qquad (11)$$

$$h_{C(k)}(r^{(i)}, \Delta x_t^{(i),0}, x_t^{(i),0}) \leq 0$$

where the decision-making module 302 first substitutes the value of states and relative states, that are known at any time instant, and then evaluates the satisfaction of the constraints for each value of the parameter vectors. If the constraints are satisfied, then the current state and values of parameter vector are inside the region.

Figure 16:
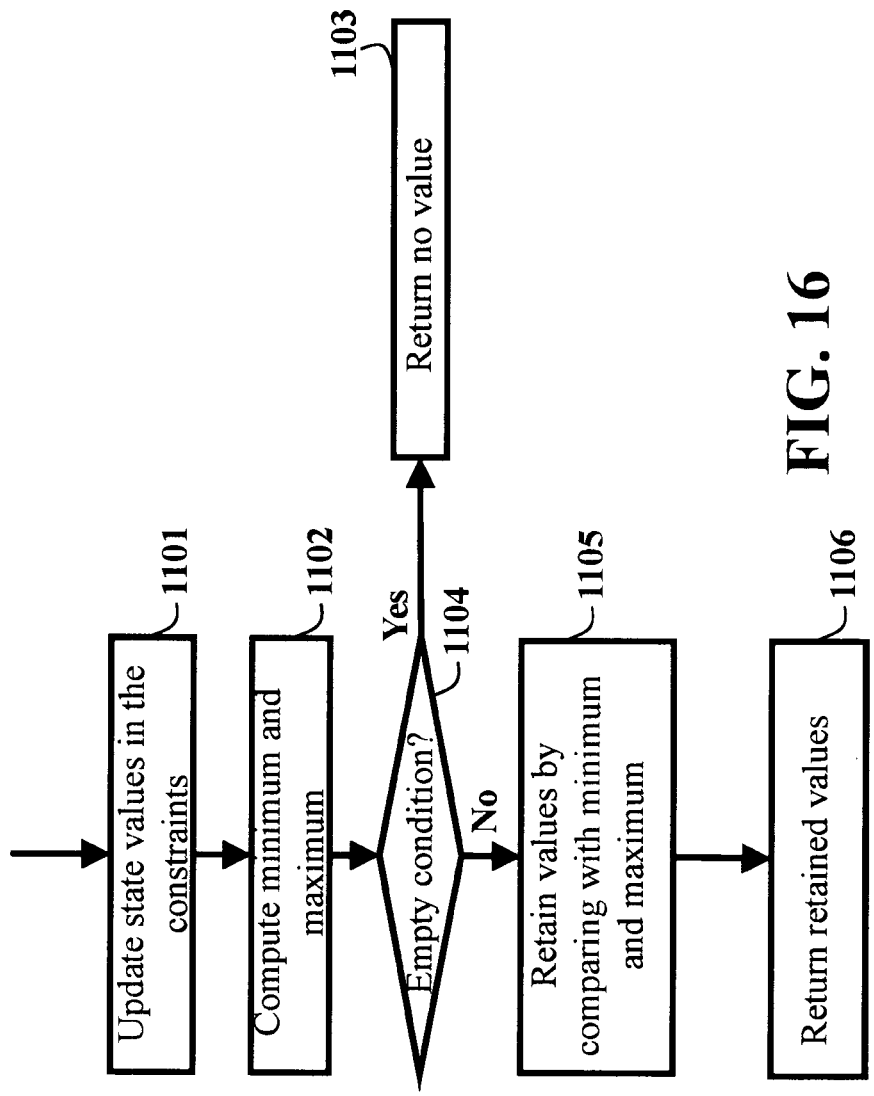
FIG. 16 shows a block diagram of an algorithm for computing whether a parameter vector value is such that a maneuver is feasible, in accordance with an example.

A special case occurs when the constraints in equation (11) are composed of linear inequalities and the parameter vector value has a single component, i.e., the parameter vector has only 1 parameter. Then, for each constraint, one can compute the maximum and minimum allowed value of the parameter value, and only compare the values of the parameter vector against such minimum and maximum, to determine whether the value is in a region. FIG. 16 shows a block diagram for the evaluation of the values of the parameter that are inside the region for the current value of the state constraints in such special case. A constraint composed of linear inequalities may be written as $H^{(i),h}[\Delta x^{(i),h'} \ r^{(i)''}] \leq K_k^{(i),h}$ and after adjusting, in step 1101, the values of the states to current values, it can be written as $a_k^{(i),h} r^{(i)} \leq b_k^{(i),h}$. The maximum and minimum are computed, in step 1102, as $$\overline{w}_k^{(i),h} = \max_{j:[a_k^{(i),h}]_j > 0} \frac{[b_k^{(i),h}]_j}{[a_k^{(i),h}]_j}, \ \underline{w}_k^{(i),h} = \min_{j:[a_k^{(i),h}]_j < 0} \frac{[b_k^{(i),h}]_j}{[a_k^{(i),h}]_j},$$

where [a]j denotes the j-th component of the vector a. The empty condition is checked, in step 1104, where it is the case that for some value j, $[a_k^{(i),h}]_j = 0$, $[b_k^{(i),h}]_j < 0$. If that condition holds, the decision-making returns that, in step 1103, no value is inside the region for the current value of the state, that is, the region does not include any value of the parameter value for the current value of the states. Otherwise, the decision making retains value by comparing them against maximum and minimum 1105, and returns, in step 1106, the retained values.

In some embodiments of the present invention, the decision-making module 302 only provides the planning and control module 303 with the next intermediate target regions that are associated to feasible maneuvers. In other embodiments of the present invention, the decision-making module provides to the planning and control module 303 the next intermediate target regions that are associated with feasible maneuvers and some additional waypoints to help guiding the generation of the trajectory by the motion planner sub-module 304. In order to do that, the decision-making module 302 selects a specific value of the parameter vector.

For instance, for maneuver/the value that optimizes an assigned objective can be selected, $$r^{(i)*} = \arg\min_{r \in \mathcal{R}_f^{(i)}} J^{(i)}(r, \theta^{(i)}) \quad (12)$$

where J is the function to be optimized, θ is the information about desired objective, such as minimum time, minimum consumption, maximum comfort, and $\mathcal{R}_f^{(i)}$ is the group of parameter vector values that are part of the set in equation (10), i.e., for which the maneuver succeeds, and $r^{(i)*}$ is the selected optimum value.

A special term that can be included in the cost function of equation (12) is the robustness of the current parameter. To this end, the decision-making module 302 computes the robustness radius for each value of the parameter vector included in $\mathcal{R}_f^{(i)}$, which means the maximum amount of value that can be added and removed to a parameter vector value such that the result is still within $\mathcal{R}_f^{(i)}$ $$\delta_{r^{(i)}} = \max\{\delta \in \mathbb{R}_+ : r^{(i)} + \varsigma \in \mathcal{R}_f^{(i)}, \forall \varsigma, |\varsigma| \le \delta\}. \quad (13)$$

Then, the maximization of the robustness radius term may be included into the cost function in equation (12), for instance by minimizing the robustness radius multiplied by a negative value.

Then, the decision-making module 302 computes the waypoints by executing the trajectory generating function of equation (2) from a current vehicle state at a current time t, for N steps into the future, using constant value of parameter vector $r=r^{(i)*}$, which results in a sequence of positions (p(t), p(t+1), . . . p(t+N) and states (x(t), x(t+1), . . . x(t+N) which are used as waypoints, for position or for position and other states. Such waypoints may be the states at each sample time spaced in time by $T_s$ according to the definition of equation (3).

Figure 17:
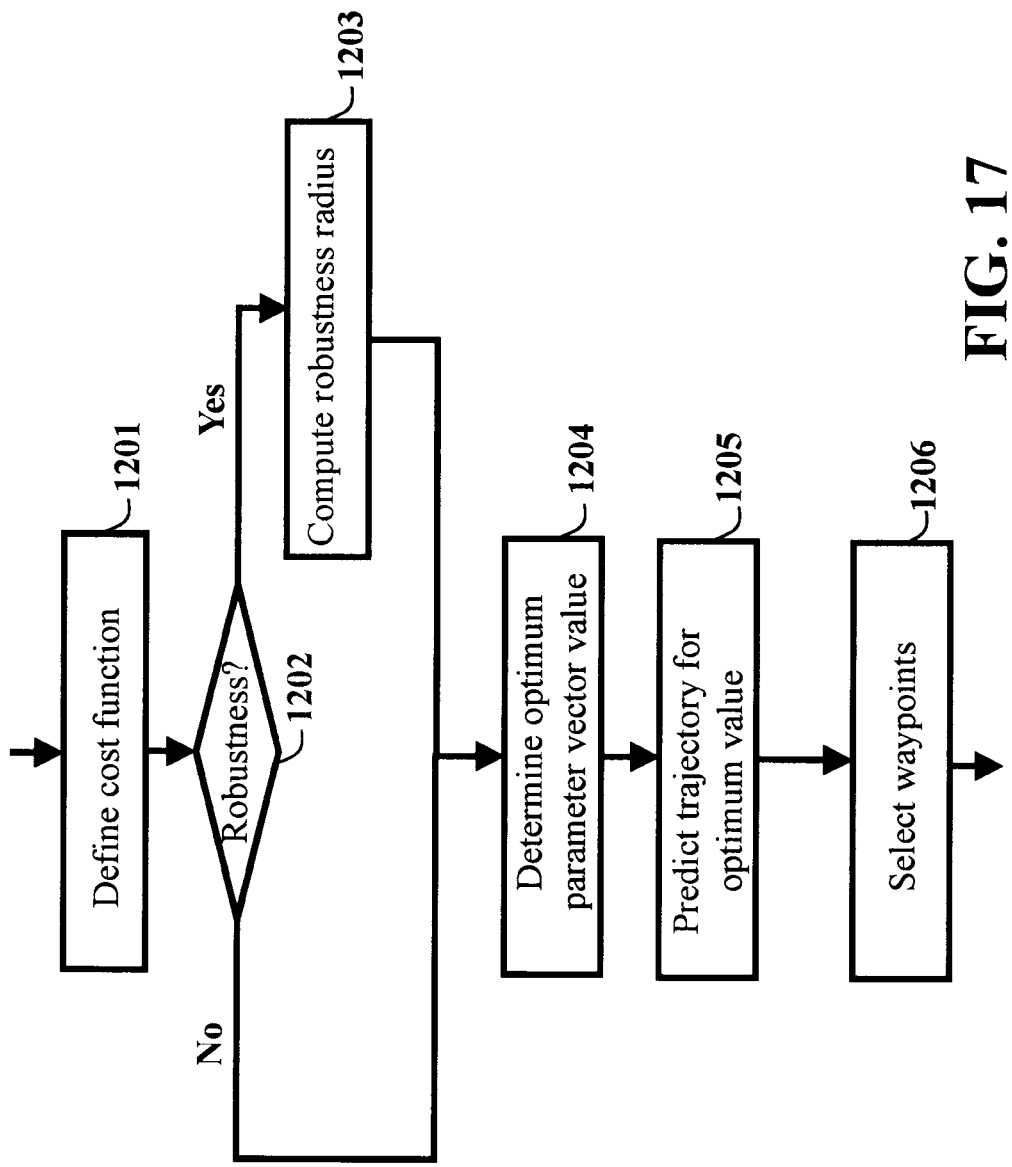
FIG. 17 shows a block diagram for determining optimal value of the parameter vector and waypoints on the corresponding trajectory, in accordance with an example.

FIG. 17 is a block diagram that summarizes the algorithm for selecting the value of the parameter vector and computing the waypoints. The function J in equation (12) to be optimized is selected, in step 1201, and if, in step 1202, robustness is considered in such function, the robustness radius is computed in step 1203 for each feasible value of the parameter vector, by equation (13). Then, the optimization equation (12) is solved, in step 1204, that determines the optimum value of the parameter vector, and, in step 1205, the trajectory corresponding to the optimum value of the parameter vector is predicted, according to (3) for r equal to the optimum value of the parameter vector and x equal to the current vehicle state. Then, in step 106, the waypoints are selected for instance as the state values along the predicted trajectory at sample times, or as a subset of those.

Summary of the Algorithm

Figure 18:
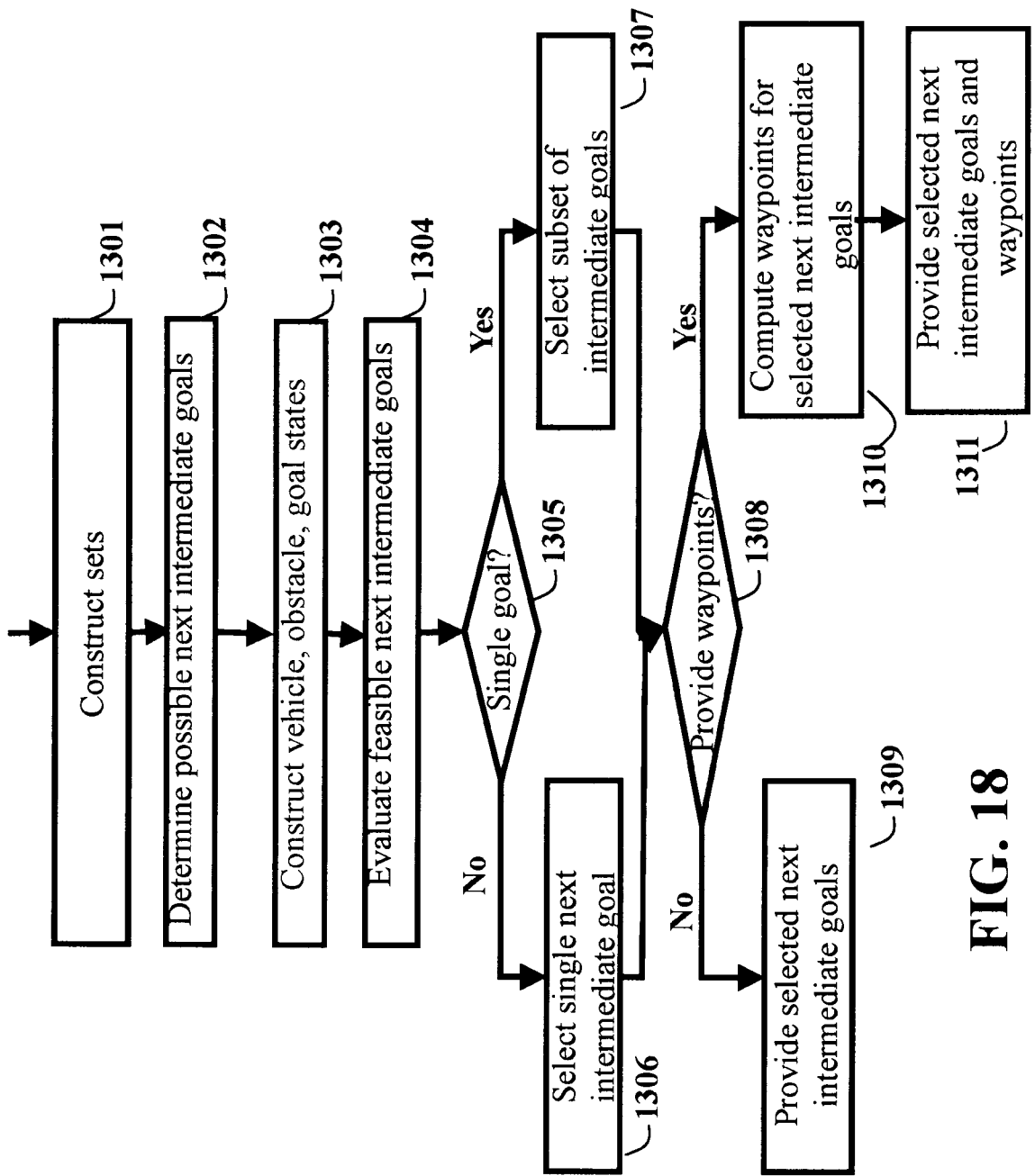
FIG. 18 shows a block diagram summarizing the algorithm for determining the next intermediate targets provided to the motion planning module, in accordance with an example.

FIG. 18 is a block diagram that summarizes the overall algorithm for decision making. First, the achieving sets of equation (8a) and colliding sets of equation (8b) sets are constructed, in step 1301, using equation (7c) or its variation equation (7d). Then, the next possible intermediate goals (targets) are determined in step 1302 from the target graph shown in FIG. 8, and the states of obstacle, targets, and the ego-vehicle are constructed in step 1303 from measurements acquired by sensors 14a, 14b, 16, on board of the vehicle or communicated from remotely placed sensors via transceiver 20. The feasibility of the next intermediate goals is determined in step 1304 by the method with block diagram summarized in FIG. 15, possibly by including a computation reduction method with the block diagram described in FIG. 16. If, in step 1305, a single goal is to be selected, the method selects, in step 1306, a single next intermediate goal among the feasible next intermediate targets based on a list of preferences for targets, otherwise a subset of feasible next intermediate targets is selected, in step 1307, based on such preference list and the number of intermediate goals which are allowed to be selected. If, in step 1308, the waypoints may not be provided, the list of selected next intermediate goals and their target regions of states is provided, in step 1309, to the motion planning and control module 303. Otherwise, the waypoints for the list of the selected next intermediate targets are computed, in step 1310, as described by the block diagram in FIG. 17 and the selected next intermediate targets, their target regions of states and the corresponding waypoints are provided, in step 1311, to the motion planning and control module 303.

In further examples, following the determination of a feasible value of a parameter vector 106, the vehicle 10 may be controlled by providing, via the decision-making module 302, the motion planning submodule 304 of the control unit 300 with the determined maneuver (as defined by the value of the parameter vector 106) and the target range of positions 150 used to determine feasibility. Further, the decision-making module 302 may also provide the motion planning submodule 304 with the achieving regions 110 used to reach the target range of positions 150 (as illustrated in FIG. 10-12). The achieving regions 110 may be used to create a suggested trajectory to reach the target range of positions 150.

In further examples, a priority value may be assigned to one or more maneuvers. The priority value may correspond to the driving decision. For example, a maneuver more likely to achieve a target region of states may be assigned a high priority value.

In further examples, the determination of a driving decision as admissible (or feasible) is computed by evaluating upper bound inequality functions to determine if the vehicle 10 is inside one of the achieving regions 110 and outside of all of the colliding regions 126. Accordingly, a first upper bound inequality function may correspond to the achieving regions 110, while a second upper bound inequality function may correspond to the colliding regions 126. The evaluation is performed by first inserting values representing the current state 116 of the vehicle 110 into the upper bound inequality functions to obtain reduced order inequalities. Redundant inequalities are then removed. Finally, values of the parameter vector 106 are determined which satisfy the reduced order inequalities. In some examples, the reduced order inequalities are determined by retaining two inequalities: a first inequality with the largest ratio of constant term and positive coefficient of the value of the current state 116, and a second inequality with the smallest ratio of constant term and negative coefficient of the value of the current state 116.

Figure 19:
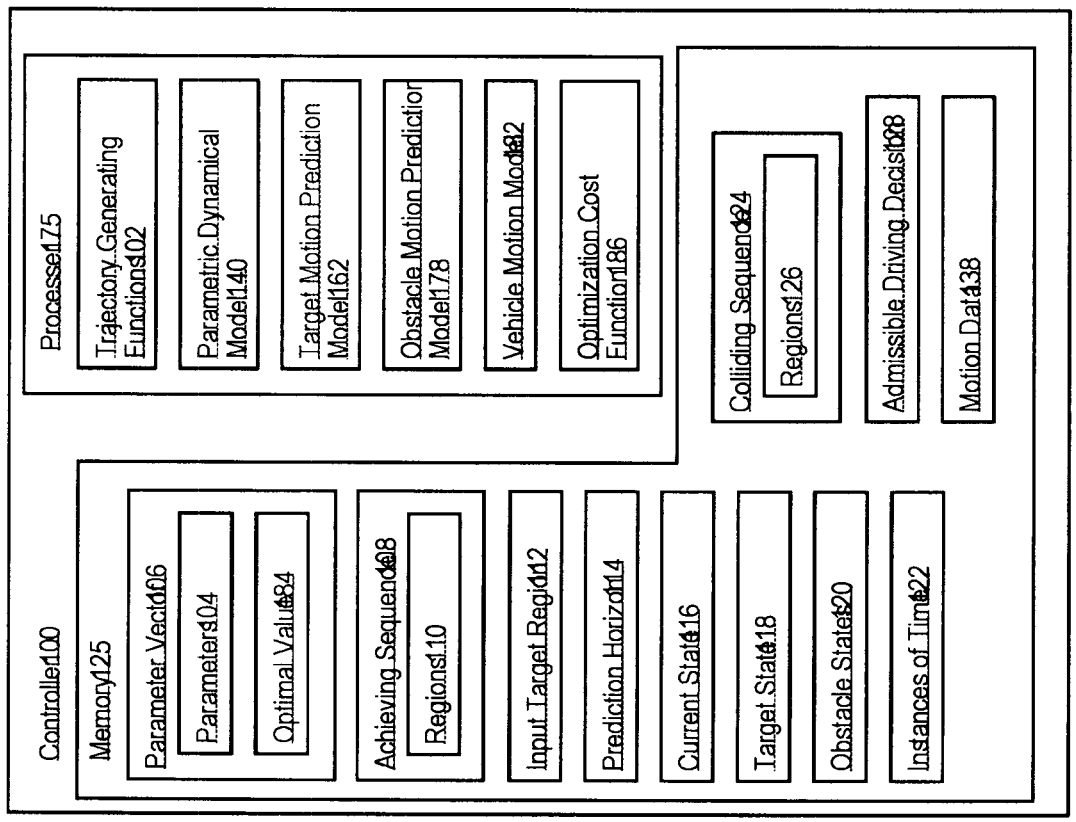
FIG. 19 is a schematic diagram of a controller having a processor and a memory, in accordance with an example.
Figure 20:
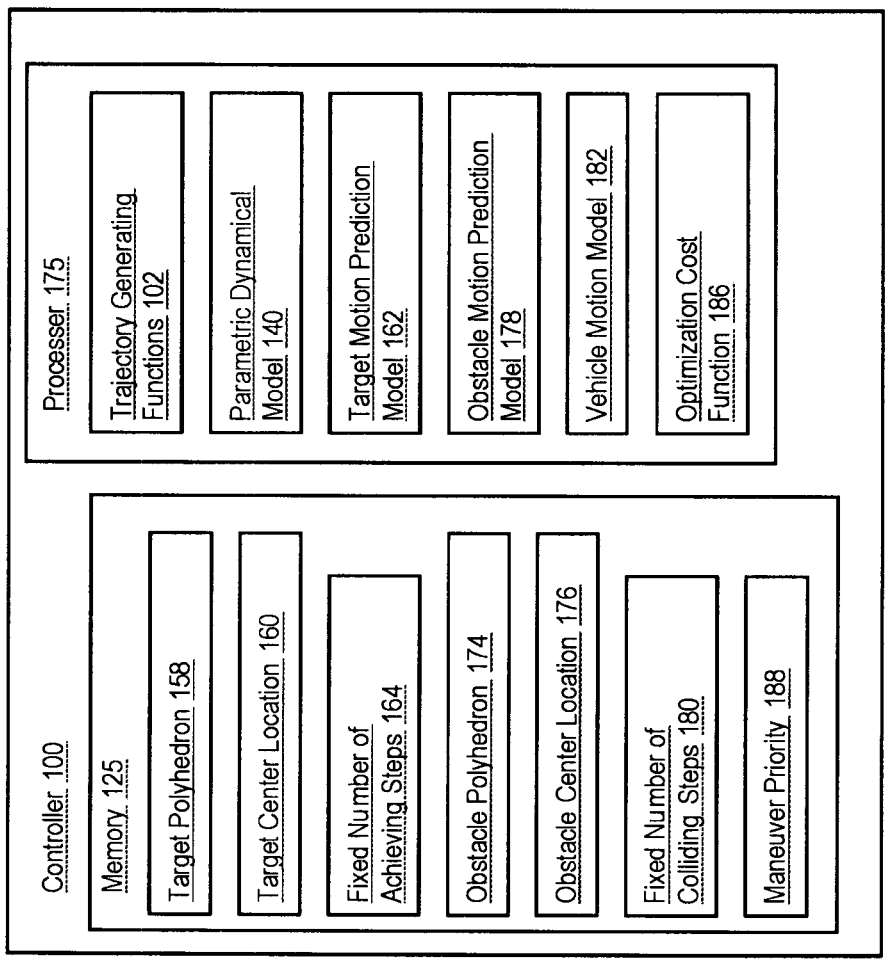
FIG. 20 is a further schematic diagram of the controller of FIG. 20, in accordance with an example.

FIGS. 19 and 20 schematically illustrate the controller 100 (also referred to as a control unit) previously depicted in FIGS. 1-3. As shown in the non-limiting examples of FIGS. 1-3, the controller 100 may be arranged within the vehicle 10. The controller 100 includes at least one memory 125 component and at least one processor component 175. The processor 175 is configured to execute one or more functions retrieved from the memory 125, such as the trajectory-generating functions 102, the parametric dynamical model 140, the target motion prediction model 162, the obstacle motion prediction model 178, the vehicle motion model 182, and/or the optimization cost function 186. The memory 125 is configured to store the parameter vectors 106 (including the parameters 104 and, in some examples, one or more optimal values 184), the achieving sequence 108 of achieving regions 110, an input target region 112 (used to generate the achieving sequence 108), a prediction horizon 114, a current state 116 of the vehicle 10, a target region of states 118 for the vehicle 10, one or more obstacle states 120 at one or more instances of time 122, one or more colliding sequences 124 of colliding regions 126, one or more admissible driving decisions 128, motion data 138 corresponding to the vehicle 10, a target polyhedron 158, a target center location 160, a fixed number of achieving steps 164, one or more obstacle polyhedrons 174, one or more obstacle center locations 176, a fixed number of colliding steps 180, and a maneuver priority 188.

Figure 21:
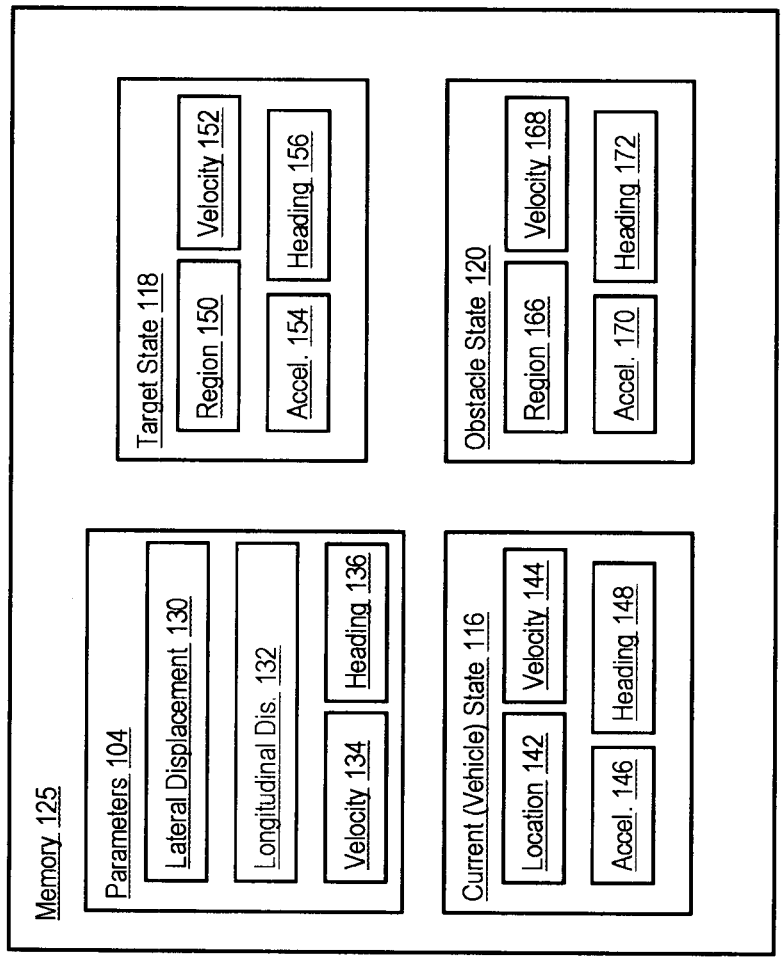
FIG. 21 is a schematic diagram of further aspects of the memory of FIG. 20, in accordance with an example.

FIG. 21 illustrates certain aspects of the memory 125 of FIGS. 19 and 20 in more detail. As shown in FIG. 21, the parameters 104 of the parameter vector 106 may include lateral displacement 130, longitudinal displacement 132, velocity 134, and/or heading 136. The current state 116 of the vehicle 10 may include location 142, velocity 144, acceleration 146, and/or heading 148. The target region of states 118 of the vehicle 10 may include range of positions 150, velocity 152, acceleration 154, and/or heading 156. The obstacle states 120 of the one or more obstacles O may include region 166, velocity 168, acceleration 170, and/or heading 172.

Figure 22:
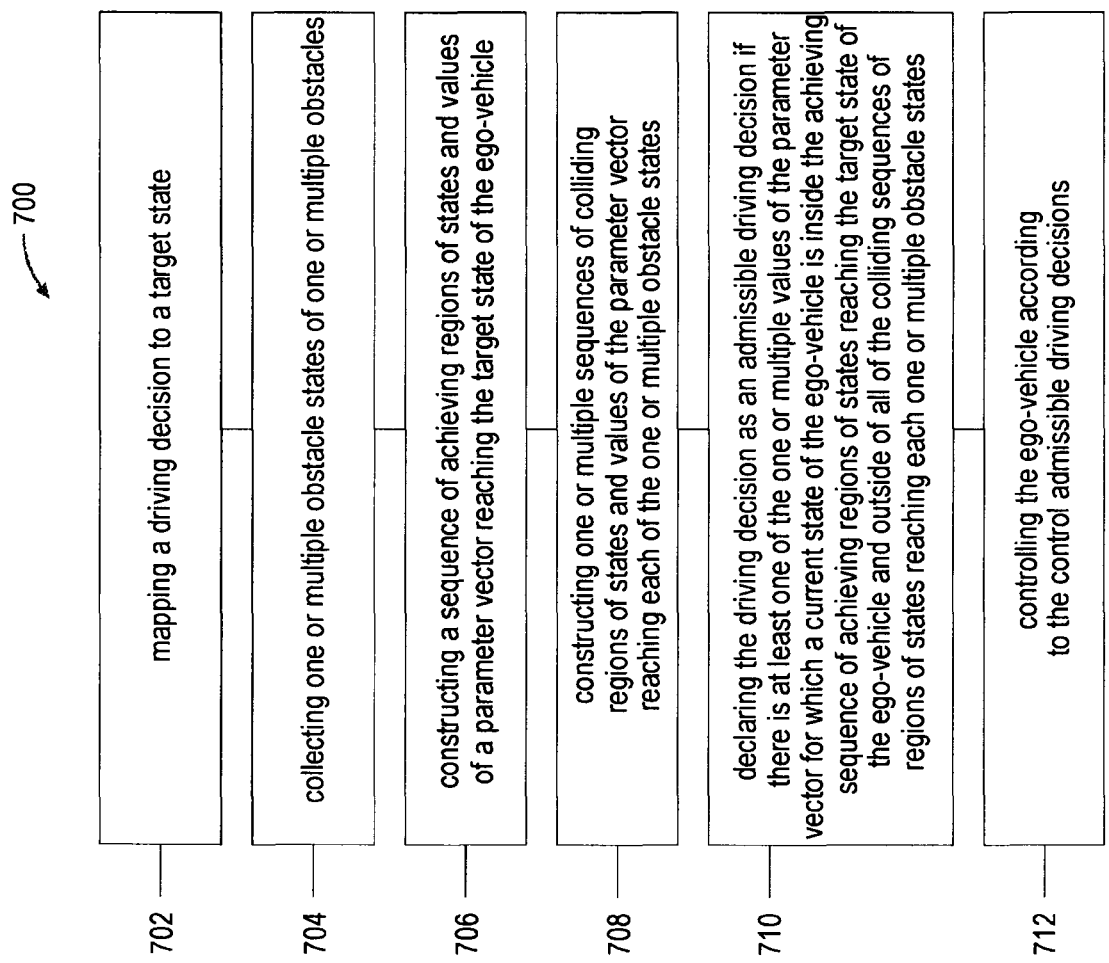
FIG. 22 is a flow chart of a method for controlling a motion of an ego-vehicle traveling to a target destination, in accordance with an example.

FIG. 22 is a flow chart of a method 700 for controlling a motion of an ego-vehicle traveling to a target destination, according to various embodiments of the invention. Referring to FIGS. 1-22, the method 700 includes, in step 702, mapping, via at least one processor 175, a driving decision to a target region of states 118 of the ego-vehicle 10 at an instance of time 122 within a prediction horizon 120.

The method 700 further includes, in step 704, collecting, via the at least one processor 175, one or multiple obstacle states 120 of one or multiple obstacles O proximate to the ego-vehicle 10 at one or multiple instances of time 122 within the prediction horizon 114.

The method 700 further includes, in step 706, constructing, via the at least one processor 175, a sequence 108 of achieving regions 110 of states and values of a parameter vector 106 reaching the target region of states 118 of the ego-vehicle 10 within the prediction horizon 144 for one of multiple trajectory-generating functions 102 associated with the driving decision for the target region of states 118 of the ego-vehicle 10. Each of the multiple trajectory-generating functions 102 corresponds to a maneuver defined by the parameter vector 106 associated with the driving decision.

The method 700 further includes, in step 708, constructing, via the at least one processor 175, one or multiple sequences 124 of colliding regions 126 of states and values of the parameter vector 106 reaching each of the one or multiple obstacle states 120 within the prediction horizon 114 for the trajectory-generating function 102 associated within the driving decision for each of the one or multiple obstacle states 120.

The method 700 further includes, in step 710, declaring, via the at least one processor 175, the driving decision as an admissible driving decision 128 if there is at least one of the one or multiple values of the parameter vector 106 for which a current state 116 of the ego-vehicle 10 is inside the achieving sequence 108 of regions 110 of states reaching the target region of states 118 of the ego-vehicle 10 and outside of all of the colliding sequences 124 of regions 126 of states reaching each one or multiple obstacle states 120.

The method 700 further includes, in step 712, controlling, via the at least one processor 175, the ego-vehicle 10 according to the admissible driving decisions 128.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

What is claimed is:

1. A control system configured for controlling a motion of an ego-vehicle traveling to a target destination, comprising:
   a memory configured to store multiple trajectory-generating functions, wherein each of the multiple trajectory-generating functions corresponds to a maneuver defined by a parameter vector associated with a driving decision of a plurality of driving decisions, wherein the parameter vector is defined by one or multiple parameters, wherein each of the multiple trajectory-generating functions is configured to generate a sequence of states within a prediction horizon, from a given value of the parameter vector and a current state of the ego-vehicle, wherein at least two of the multiple trajectory-generating functions are configured for different types of parameters of the parameter vector; and
   at least one processor coupled with stored instructions, which when executed by the processor, cause the control system to test control admissibility of at least some of the driving decisions consistent with the target destination of the ego-vehicle at the current state, wherein, for testing, the processor is configured to:
      map a tested driving decision to a target region of states of the ego-vehicle at an instance of time within the prediction horizon;
      collect one or multiple obstacle states of one or multiple obstacles proximate to the ego-vehicle at one or multiple instances of time within the prediction horizon;
      construct the sequence of achieving regions of states and values of the parameter vector reaching the target region of states of the ego-vehicle within the prediction horizon for the trajectory-generating function associated with the tested driving decision for the target region of states of the ego-vehicle;
      construct one or multiple sequences of colliding regions of states and values of the parameter vector reaching each of the one or multiple obstacle states within the prediction horizon for the trajectory-generating function associated with the tested driving decision for each of the one or more obstacle states;
      declare the tested driving decision as an admissible driving decision if there is at least one of the one or multiple values of the parameter vector for which the current state of the ego-vehicle is inside the achieving sequence of regions of states reaching the target region of states of the ego-vehicle and outside of all of the sequences of regions of states reaching each one or multiple obstacle states; and
      control the ego-vehicle according to a motion model corresponding to the admissible driving decisions to reach the target region of states associated with the admissible driving decision.

2. The control system of claim 1, wherein at least one value of the one or multiple parameters of the parameter vector is a steady state target value for the motion generated by the trajectory-generating function, and wherein the one or multiple parameters of the parameter vector comprise target lateral displacement, target longitudinal displacement, target velocity, and/or target heading.

3. The control system of claim 1, wherein at least one of the trajectory-generating functions are generated by fitting motion data according to a parametric dynamical model.

4. The control system of claim 1, wherein at least one of the multiple trajectory-generating functions is obtained by combining a motion model with a vehicle controller model, and wherein a value of the parameter vector associated with the at least one of the multiple trajectory-generating functions is a setpoint of the control system.

5. The control system of claim 1, wherein the driving decision comprises changing lanes, following a lane, stopping, turning left, or turning right.

6. The control system of claim 1, wherein the current state of the ego-vehicle comprises a current location and at least some of a current velocity, a current acceleration, and/or a current heading.

7. The control system of claim 6, wherein the target region of states comprises a target region of positions and at least some of a target velocity, a target acceleration, and/or a target heading.

8. The control system of claim 7, wherein the target region is represented as a target polyhedron about a target center location, and wherein the target center location moves according to a motion prediction model, and wherein the achieving sequence of achieving regions of states and values of the parameter vector is constructed such that if a parameter value of the achieving sequence is applied to a corresponding state value, the target region is entered within a fixed number of achieving steps, and wherein the fixed number of achieving steps is shorter than a length of the maneuver which is shorter or equal to the prediction horizon.

9. The control system of claim 1, wherein at least one of the one or multiple obstacle states comprise an obstacle region, and at least some of an obstacle velocity value, an obstacle acceleration value, and/or an obstacle yaw rate value.

10. The control system of claim 9, wherein the obstacle region is represented as an obstacle polyhedron about an obstacle center location, and wherein the obstacle center location moves according to a motion prediction model, and wherein at least one of the colliding sequences of colliding regions of states and values of the parameter vector is constructed such that if a parameter value of at least one of the colliding sequences is applied to a corresponding state value, the obstacle region is entered within a fixed number of colliding steps, and wherein the fixed number of colliding steps is shorter than a length of the maneuver.

11. The control system of claim 1, wherein at least one of the sequence of achieving regions of states and/or the one or multiple sequences of colliding regions of states associated to at least one of the multiple trajectory-generating functions are computed prior to vehicle system operation and stored in the memory.

12. The control system of claim 1, wherein, upon determining one value of the parameter vector for one driving decision determined to be the admissible driving decision, the control system stops testing others.

13. The control system of claim 1, wherein the processor is further configured to determine all values of the parameter vector with a given value range that corresponds to the admissible driving decisions.

14. The control system of claim 1, wherein the driving decision is declared as the admissible driving decision by evaluating upper bound inequalities determining one or more regions within the achieving regions and outside of the colliding regions, wherein the upper bound inequalities are evaluated by:
    inserting values corresponding to the current state of the ego-vehicle into the upper bound inequalities to obtain reduced order inequalities;
    removing redundant inequalities; and
    determining one or more values of the parameter vector that satisfy the reduced order inequalities.

15. The control system of 14, wherein the reduced order inequalities comprise a first inequality and a second inequality, wherein the first inequality is obtained by retaining one of the reduced order inequalities with the largest ratio of constant term and positive coefficient of the value of the current state, and wherein the second inequality is obtained by retaining one of the reduced order inequalities with the smallest ratio of constant term and positive coefficient of the value of the current state.

16. The control system of claim 1, wherein the admissible driving decision is selected according to a maneuver priority level, wherein the maneuver priority level corresponds to a desirability of the maneuver for driver comfort and driver performance.

17. The control system of claim 1, wherein a value of the parameter vector is determined by optimizing a cost function subject to constraints of the value of the parameter vector that must result in the admissible driving decision, wherein the cost function includes at least one of the following terms: maneuver velocity, maneuver completion time, driver comfort, maneuver aggressiveness, parameter value amplitude, and maneuver robustness, and wherein the maneuver robustness is defined as the maximum value that any perturbation of amplitude equal or smaller than such maximum value still results in an admissible maneuver.

18. The control system of claim 1, wherein the processor controls ego-vehicle by providing a motion planner of the ego-vehicle the maneuver and the target region of states corresponding to the admissible driving decision, wherein the processor further provides the motion planner with a set of achieving regions providing a suggested trajectory to achieve the target region of states, wherein the suggested trajectory is computed by the trajectory-generating function of the maneuver corresponding to the admissible driving decision for the value of the parameter vector achieving the target region of states from the current state of the vehicle.

19. A method for controlling a motion of an ego-vehicle traveling to a target destination, comprising:
    mapping, via at least one processor, a driving decision to a target region of states of the ego-vehicle at an instance of time within a prediction horizon;
    collecting, via the at least one processor, one or multiple obstacle states of one or multiple obstacles proximate to the ego-vehicle at one or multiple instances of time within the prediction horizon;
    constructing, via the at least one processor, a sequence of achieving regions of states and values of a parameter vector reaching the target region of states of the ego-vehicle within the prediction horizon for one of multiple trajectory-generating functions associated with the driving decision for the target region of states of the ego-vehicle, wherein each of the multiple trajectory-generating functions corresponds to a maneuver defined by the parameter vector associated with the driving decision;
    constructing, via the at least one processor, one or multiple sequences of colliding regions of states and values of the parameter vector reaching each of the one or multiple obstacle states within the prediction horizon for the trajectory-generating function associated within the driving decision for each of the one or multiple obstacle states;
    declaring, via the at least one processor, the driving decision as an admissible driving decision if there is at least one of the one or multiple values of the parameter vector for which a current state of the ego-vehicle is inside the achieving sequence of regions of states reaching the target region of states of the ego-vehicle and outside of all of the colliding sequences of regions of states reaching each one or multiple obstacle states; and
    controlling, via the at least one processor, the ego-vehicle according to the admissible driving decisions to reach the target region of states of the admissible driving decision.

20. A non-transitory computer readable memory embodied thereon a program executable by at least one processor for performing a method for controlling a motion of an ego-vehicle traveling to a target destination, comprising:
    mapping, via at least one processor, a driving decision to a target region of states of the ego-vehicle at an instance of time within a prediction horizon;
    collecting, via the at least one processor, one or multiple obstacle states of one or multiple obstacles proximate to the ego-vehicle at one or multiple instances of time within the prediction horizon;
    constructing, via the at least one processor, a sequence of achieving regions of states and values of a parameter vector reaching the target region of states of the ego-vehicle within the prediction horizon for one of multiple trajectory-generating functions associated with the driving decision for the target region of states of the ego-vehicle, wherein each of the multiple trajectory-generating functions corresponds to a maneuver defined by the parameter vector associated with the driving decision;
    constructing, via the at least one processor, one or multiple sequences of colliding regions of states and values of the parameter vector reaching each of the one or multiple obstacle states within the prediction horizon for the trajectory-generating function associated within the driving decision for each of the one or multiple obstacle states;
    declaring, via the at least one processor, the driving decision as an admissible driving decision if there is at least one of the one or multiple values of the parameter vector for which a current state of the ego-vehicle is inside the achieving sequence of regions of states reaching the target region of states of the ego-vehicle and outside of all of the colliding sequences of regions of states reaching each one or multiple obstacle states; and controlling, via the at least one processor, the ego-vehicle according to the admissible driving decisions to reach the target region of states the admissible driving decision.

* * * * *